US006171702B1

(12) United States Patent
Malhotra et al.

(10) Patent No.: US 6,171,702 B1
(45) Date of Patent: Jan. 9, 2001

(54) COATED SUBSTRATES

(75) Inventors: Shadi L. Malhotra; Kirit N. Naik, both of Mississauga (CA)

(73) Assignee: Xerox Corporation, Stamford, CT (US)

( * ) Notice: Under 35 U.S.C. 154(b), the term of this patent shall be extended for 0 days.

(21) Appl. No.: 09/118,459

(22) Filed: Jul. 17, 1998

(51) Int. Cl.[7] .......... B32B 9/04

(52) U.S. Cl. .......... 428/411.1; 428/195; 428/211; 428/327; 428/532

(58) Field of Search .......... 428/195, 211, 428/411.1, 327, 532

(56) References Cited

U.S. PATENT DOCUMENTS

| | | | | |
|---|---|---|---|---|
| 3,911,180 | * | 10/1975 | Ozaki et al. | 427/362 |
| 4,157,388 | * | 6/1979 | Chistiansen | 424/70 |
| 4,663,216 | * | 5/1987 | Toyoda et al. | 428/212 |
| 4,705,719 | * | 11/1987 | Yamanaka et al. | 428/323 |
| 4,719,282 | * | 1/1988 | Nadolsky et al. | 528/310 |
| 4,795,676 | * | 1/1989 | Maekawa et al. | 428/328 |
| 4,903,041 | * | 2/1990 | Light | 346/1.1 |
| 4,997,697 | * | 3/1991 | Malhotra | 428/195 |
| 5,227,460 | * | 7/1993 | Mahabadi et al. | 528/272 |
| 5,294,483 | * | 3/1994 | Beavers et al. | 428/336 |
| 5,314,747 | * | 5/1994 | Malhotra et al. | 428/341 |
| 5,320,902 | * | 6/1994 | Malhotra et al. | 428/342 |
| 5,446,082 | * | 8/1995 | Asai et al. | 524/389 |
| 5,589,277 | * | 12/1996 | Malhotra | 428/500 |
| 5,624,743 | * | 4/1997 | Malhotra | 428/216 |

* cited by examiner

*Primary Examiner*—Bruce H. Hess
*Assistant Examiner*—Michael E. Grendzynski
(74) *Attorney, Agent, or Firm*—E. O. Palallo

(57) ABSTRACT

A coated xerographic substrate comprised of a substrate with four coating layers, two coating layers on the front side of the substrate and two coating layers on the reverse side of the substrate, wherein said front side coatings are comprised of a antistatic hydrophilic layer in contact with the substrate comprised of a blend of (1) a hydrophilic binder, (2) a water soluble filler, (3) a water insoluble filler, (4) an antistatic cationic component (5) an optional filler dispersant, and (6) an optional biocide, and the second coating situated on top of the first coating comprised of (1) an ester binder,(2) a toner wetting agent, (3) a lightfast UV absorber, (4) a lightfast antioxidant/antiozonant compound, and (5) a filler; and wherein said two coatings in contact with the reverse side of the substrate are comprised of a third hydrophilic antistatic coating comprised of (1) a binder polymer, (2) a water soluble filler, (3) a water insoluble filler, (4) an antistatic agent, (5) a filler dispersant and (6) an optional biocide, and a fourth toner receiving coating layer on top of the third hydrophilic coating comprised of (1) a latex binder, (2) a toner wetting agent, (3) a lightfast UV absorber, (4) a lightfast antioxidant compound, (5) a lightfast antiozonant compound (6) filler, and (7) a biocide.

24 Claims, No Drawings

COATED SUBSTRATES

PENDING APPLICATIONS

There is illustrated in copending application U.S. Ser. No. 09/118,446 the disclosure of which is totally incorporated herein by reference, a transparency comprised of a substrate with two coating layers on the front side of the substrate and two coating layers on the reverse side of the substrate, wherein said front side coatings are comprised of an antistatic hydrophilic layer in contact with the substrate and which layer is comprised of a blend of (1) a hydrophilic binder, (2) a water soluble acid salt, (3) a cationic component, and (4) a biocide, and the second coating situated on top of the first coating is comprised of (1) a latex binder, (2) a toner wetting agent, (3) a lightfast UV absorber, (4) a lightfast antioxidant, and (5) a lightfast antiozonant compound; and wherein said two coatings in contact with the reverse side of the substrate are comprised of a third hydrophilic antistatic coating comprised of a blend of (1) a hydrophilic binder, (2) a water soluble acid salt, (3) a cationic component (4) a luminescent component and (5) a biocide, and the fourth coating situated on top of the third coating is comprised of (1) a latex binder, (2) a toner wetting agent, (3) a lightfast UV absorber, (4) a lightfast antioxidant, and (5) a lightfast antiozonant compound.

Also, there is illustrated in copending application U.S. Ser. No. 09/118,573, the disclosure of which is totally incorporated herein by reference, a composition comprised of a solvent, a polymeric binder, a dye mordant, a substantially water soluble anticurl compound, a substantially water soluble desizing compound, a lightfastness compound, a defoamer, an optional biocide, and an optional filler.

There also is illustrated in copending application U.S. Ser. No. 09/118,961, the disclosure of which is totally incorporated herein by reference, a transparency comprised of a supporting substrate, and thereover two coatings, (1) a first heat dissipating coating layer in contact with the substrate, and wherein said first coating is comprised of a heat dissipating binder optionally with a melting point in the range of from between about 100° C. to about 260° C. and an antistatic compound; and (2) a second ink receiving coating layer thereover comprised of a blend of a binder polymer, and an alkylated oxazoline, a lightfast UV compound, and an optional biocide.

The appropriate components and processes of the copending applications may be selected for the present invention in embodiments thereof.

BACKGROUND OF THE INVENTION

The present invention is directed to coated substrates such as coated papers and coated transparencies useful in for example, electrography such as xerography. Specifically the present invention is directed to coated papers containing a supporting substrate derived from natural cellulose and having the appearance of a photographic paper, and which paper contains certain coatings thereover and thereunder and the use of these papers in xerographic imaging with liquid inks or dry toners. More specifically, the present invention is directed to xerographic papers capable of absorbing fuser oil, recording clear, brilliant, glossy images of high optical density, and with lightfast values of greater than 98 percent, and more specifically from about 98 to about 100 percent for all toner colorants, waterfast values of about 100 percent, and comparable in look and feel to conventional color photographic prints with xerographic printing, reference copending application U.S. Ser. No. 09/041,353, the disclosure of which is totally incorporated herein by reference.

PRIOR ART

There is disclosed in U.S. Pat. No. 3,911,180 a method for the preparation of resin coated paper with a relatively smooth surface, and which paper is comprised of a thermoplastic resin layer on the paper and wherein the resin is pressed between two or more rolls including a metal roll which contacts the resin coated surface, and where the surface temperature of the rolls is retained at 30° C. to 150° C. and the pressure between the rolls is retained at for example, about 50 kg/cm to 350 kg/cm.

Further there is disclosed in U.S. Pat. No. 4,663,216 a synthetic paper printable comprised of (1) multilayer support, (2) a layer of a transparent film of a thermophotographic resin free from an inorganic fine powder formed on one surface of the support (1) and (3) a primer layer of a specific material, reference the Abstract of the Disclosure for example. The support (1) comprises (1a) a base layer of a biaxially stretched film of a thermophotographic resin, a surface and a back layer (1b) and (1c) composed of a monoaxially stretched film of a thermo photographic resin containing 8 to 65 percent by weight of an inorganic fine powder.

Moreover, there is disclosed in U.S. Pat. No. 4,705,719 a synthetic paper of multilayer resin film comprising a base layer (1a) of a biaxially stretched thermophotographic resin film, and a laminate provided on at least one of opposite surfaces of said base layer, the laminate including a paper-like layer (1b) and a surface layer (1c), the paper like layer containing a uniaxially stretched film of thermophotographic resin containing 8 to 65 percent by weight of inorganic fine powder, said surface layer being constituted by a uniaxially stretched film made of a thermophotographic resin.

Also known is an electrostatic recording material comprised of a multi-layered sheet support having an electroconductive layer and dielectric layers formed thereon, reference for example U.S. Pat. No. 4,795,676.

There is disclosed in U.S. Pat. No. 4,903,041 an opaque paper-based receiving material for ink jet printing which comprises a poly(olefin)-coated paper overcoated with an ink-receiving layer which contains an aqueous dispersion of a polyester ionomer, namely a poly [cyclohexylenedimethylene]-co-xylylene terephthalate-co-malonate-co-sodioimino-bis[sulfonylbenzoate], dispersed in vinyl pyrrolidone polymer.

U.S. Pat. No. 4,997,697 discloses a transparent substrate material for receiving or containing an image which comprises a supporting substrate base, an antistatic polymer layer coated on one or both sides of the substrate and comprising hydrophilic cellulosic components, and a toner receiving polymer layer contained on one or both sides of the antistatic layer, which polymer comprises hydrophobic cellulose ethers, hydrophobic cellulose esters, or mixtures thereof, and wherein the toner receiving layer contains adhesive components.

Further, there is disclosed in U.S. Pat. No. 5,294,483 a method of providing a thin copolyester coating on paper which comprises extruding a thin copolyester coating on paper to form a coated sheet and passing the paper through a nip formed by a pair of cooperating chill and pressure rolls, wherein the copolyester consists essentially of repeat units of terephthalic acid, ethylene glycol, about 1.5–2.0 mol percent of an aliphatic or cyclo aliphatic glycol having 2 to 10 carbon atoms, and 0 to about 1.0 mol percent of a polyfunctional branching agent. Also disclosed is the coated paper prepared by this method.

Moreover, there is disclosed in U.S. Pat. No. 5,446,082 a water dispersible polyester composition for an image recording medium, comprising (1) a polyester having a glass transition temperature of not less than 40° C., a specific gravity of not less than 1.25, a value of SP of 9.5 to 12.0, and at least one kind of hydrophilic polar group, and which is insoluble in methyl ethyl ketone, toluene, and a mixed solvent thereof, wherein 65 percent by mole or more of a glycol component constituting the polyester is ethylene glycol, in a proportion of 5 to 50 percent by weight, (2) an organic compound compatible with water in a proportion of for example, 0 to 20 percent by weight, and (3) water in a proportion of 30 to 95 percent by weight all percentages by weight being based upon the total weight of said composition containing components (1), (2) and (3).

While the above prior art papers are suitable for their intended purposes, a need remains for improved paper particularly suitable for use in electrophotographic applications that employ heat for fixing inks and toners. In addition, a need remains for paper with excellent lightfast properties in the range of for example, from about 80 to about 95 percent, a feature not easily obtained especially considering that the total thickness of the coatings on each side of paper can range for example from about 2 to 25 microns and average about 15 microns. There is also a need for improved waterfast images on papers, and a need for paper with certain gloss values. Further, there is a need for paper coated with a discontinuous porous film which is further overcoated with a toner receiving layer to primarily prevent buildup of fuser oil from the fuser on the toned image. There is also a need for paper which, subsequent to being imaged with a toner, exhibits reduced curling. These and other needs are achievable with the paper of the present invention in embodiments thereof.

SUMMARY OF THE INVENTION

It is an feature of the present invention to provide papers with many of the advantages illustrated herein.

It is another feature of the present invention to provide papers capable of absorbing fuser oil particularly suitable for use in electrophotographic systems that employ oil containing fuser rolls that heat and fix the developed image.

It is another feature of the present invention to provide coated substrates such as coated papers with high optical density such as optical density values of about 1.50 to about 1.60 (cyan), about 1.35 to about 1.50 (magenta), about 0.95 to about 1.05 (yellow) and about 1.55 to about 1.70 (black), gloss values of between about 85 and about 90, about 100 percent waterfast for example, when washed with water for 2 minutes at 50° C. and about 100 percent lightfast for a period of three months without any change in their optical density.

It is yet another feature of the present invention to provide coated substrates wherein the color gamut is acceptable and does not substantially change over extended time periods.

It is yet another feature of the present invention to provide coated substrates that absorb fuser oil from the fuser and prevent its excessive buildup on the toned image.

Moreover, another feature of the present invention is to provide coated substrates with the combination of excellent lightfast properties, such as from about 90 to about 98, and wherein the color gamut is acceptable and does not substantially change.

These and other features of the present invention can be accomplished in embodiments thereof by providing papers with coatings thereover and thereunder.

Aspects of the present invention include; a coated xerographic substrate comprised of a substrate with four layers, two coating layers on the front side of the substrate and two coating layers on the reverse side of the substrate, wherein the front side coatings are comprised of a antistatic hydrophilic layer in contact with the substrate comprised of a blend of (1) a hydrophilic binder, (2) a water soluble filler, (3) a water insoluble filler, (4) an antistatic component (5) an optional filler dispersant, and (6) an optional biocide, and a second hydrophobic toner receiving coating situated on top of the first coating comprised of (1) a binder, (2) a toner wetting agent, (3) a lightfast UV absorber, (4) a lightfast antioxidant/antiozonant compound, and (5) a filler; and wherein said two coatings in contact with the reverse side of the substrate are comprised of a third hydrophilic antistatic coating comprised of (1) a binder polymer, (2) a water soluble filler, (3) a water insoluble filler, (4) an antistatic agent, (5) an optional filler dispersant and (6) an optional biocide, and a fourth toner receiving coating layer on top of the third hydrophilic coating comprised of (1) a latex binder, (2) a toner wetting agent, (3) a lightfast UV absorber, (4) a lightfast antioxidant compound, (5) a lightfast antiozonant compound, (6) filler, and (7) a biocide; a coated substrate wherein said substrate is a porous cellulosic component; a coated substrate wherein the cellulosic substrate is comprised of alkaline sized and acid sized blends of hardwood kraft and softwood kraft fibers which blends contain from about 10 percent to 90 percent by weight of soft wood and from about 90 to about 10 percent by weight of hardwood; a coated xerographic paper wherein the sizing value of the cellulosic substrate is from about 200 seconds to about 1,100 seconds, the porosity is between about 50 and about 300 mil/minute and the thickness of the substrate is between about 50 microns about 250 microns; a coated xerographic paper wherein in the first hydrophilic coating layer the binder is present in amounts of from about 70 parts by weight to about 20 parts by weight, the water soluble filler is present in an amount of from about 4 parts by weight to about 30 parts by weight, the antistatic component is present in an amount of from about 5 parts by weight to about 1 parts by weight, the filler is present in amounts of from about 16 parts by weight to about 48 parts by weight, the filler dispersant is present in amounts of from about 3 parts by weight to about 0.9 parts by weight, and the biocide is present in amounts of from about 2 parts by weight to about 0.1 part by weight; a coated substrate wherein the hydrophilic binder of the first antistatic coating are (1) cellulose, (2) methyl cellulose, (3) ethyl hydroxy ethyl cellulose, (4) hydroxypropyl methyl cellulose, (5) diethylammonium chloride hydroxyethyl cellulose, (6) hydroxypropyl trimethyl ammonium chloride hydroxyethyl cellulose, (7) sodium carboxymethyl cellulose, (8) poly(acrylamide), (9) acrylamide-acrylicacid copolymers, or (10) poly(ethylene oxide); a coated substrate wherein hydrophilic polymer of the said antistatic coating is hydroxypropylpyl methylcellulose, or acrylamide-acrylic acid copolymers; a coated substrate wherein the water soluble salts of the first layer are selected from the group consisting of (1) inorganic salts, (2) organic salts, (3) and mixtures thereof; a substrate wherein said salts are sodium carbonate, or calcium propionate; a coated substrate wherein the filler of the first hydrophilic antistatic coating is selected from the group consisting of (1) hollow composite microspheres of polyvinylidene chloride/acrylonitrile copolymer shell 15 percent by weight and calcium carbonate 85 percent by weight, (2) zirconium oxide, (3) colloidal silicas, (4) titanium dioxide (5) barium titanate, and mixtures thereof; a substrate wherein said coating is comprised of hollow composite microspheres of polyvinylidene chloride/acrylonitrile copolymer shell about 15 percent by weight and calcium carbonate about 85 percent by weight; a coated substrate wherein the dry thickness of the first antistatic coating layer is about 0.1 micron to about 25 microns; a coated substrate wherein in the second toner receiving layer of the binder is present in amounts of from about 50 parts by weight to about 20 parts by weight, the toner wetting agent is present in an amount of from about 25 parts by weight to about 5 parts by weight, the lightfast UV absorber compound is present in an amount of from about 8 parts by weight to about 0.5 parts by weight, the lightfast antioxidant compound is present in an amount of from about 4 parts by weight to about 0.25 parts by weight, the lightfast antiozonant compound is present in an amount of from about 4 parts by weight to about 0.25 parts by weight and, the filler is present in amounts of from about 13 parts by weight to about 74 parts by weight; a coated substrate wherein the binders of the second toner receiving layer present in amounts of from about 50 parts by weight to about 20 parts by weight are selected from the group consisting of esters of (1) polyethylene terephthalate resins, (2) polybutylene terephthalate ester resins, (3) polyester-ether resins, (4) polycarbonates, and (5) polyester-co-polycarbonate; a substrate wherein said ester is a polyethylene terephthalate polymer; a coated substrate the toner wetting agents of the second layer is present in an amount of from about 25 parts by weight to about 5 parts by weight are selected from the group consisting of (1) monoalkyl esters, (2) dialkyl esters, (3) trialkyl esters, (4) alkyl triesters, (5) alkoxyesters, (6) pentaerythritol esters and (7) peroxy esters; a substrate wherein said ester is a mono alkyl ester; a coated substrate wherein the dry thickness of the second toner receiving coating layer is between about 0.1 microns to about 25 microns; a coated substrate wherein the dry thickness of the third hydrophilic coating layer is between about 0.1 micron to about 25 microns; a coated substrate wherein in the fourth coating the binder is present in an amount of from about 50 parts by weight to about 20 parts by weight, the toner wetting agent is present in an amount of from about 25 parts by weight to about 5 parts by weight, the lightfast UV absorber compound is present in an amount of from about 6 parts by weight to about 0.5 part by weight, the lightfast antioxidant compound is present in an amount of from about 3 parts by weight to about 0.25 part by weight, the lightfast antiozonant compound is present in an amount of from about 3 parts by weight to about 0.25 part by weight, the filler is present in an amount of from about 11 parts by weight to about 73 parts by weight and, the biocide is present in an amount of from about 2 parts by weight to about 1 part by weight; a coated substrate wherein the binder of the fourth layer is present in amounts of from about 50 to about 20 parts by weight and is comprised of anionic latex binders of (1) polyglycolide, (2) polyglactin, (3) preferred is-polyester latex, (4) styrene-butadiene latex, (5) styrene-acrylate latex, (6) ethylene-vinylacetate latex, (7) vinyl acetate-acrylic copolymer latex, or (8) butadiene-acrylonitrile-styrene terpolymer latex; a coated substrate wherein the binder of the fourth layer is a polyester latex, the tone wetting agent of the fourth layer is present in amounts of from about 25 to about 5 parts by weight and is: (1) a glyceryl ester, (2) a glycol ester, or (3) a sugar ester; a method of preparing a coated xerographic substrate comprised of a substrate with two coating layers on the front side and two coating layers on the reverse side of the substrate; wherein the said two front side coatings are comprised of a first antistatic hydrophilic layer in contact with the substrate, and a second hydrophobic toner receiving coating situated on top of the first coating and wherein the said two coatings in contact with the reverse side of the substrate are comprised of a third hydrophilic antistatic coating in contact with the substrate, and a fourth hydrophilic toner receiving coating layer on top of the third hydrophilic coating; said method comprising (1) coating the first hydrophilic layer from a mixture of solvents where at least one solvent is a solvent for the coating layer and at least one other solvent is a gelling agent for the coating layer, and drying the coating layer at incremental temperatures in progressive air drying zones, (2) coating the second hydrophobic toner layer from a solvent, and drying the coated layer at one temperature in air drying zones, (3) coating the third and fourth hydrophilic coatings simultaneously from a mixture of solvents where at least one solvent is a solvent for the coating layer and at least one solvent is a gelling agent for the coating layer, and drying the coated layers at incremental temperatures in progressive air drying zones; a method wherein the solvents of the first hydrophilic layer are present in an amount of from about 25 percent by weight to about 75 percent by weight are selected from the group consisting of (1) water, (2) lactic acid 85 percent solution in water, (3) formylmorpholine, (4) 2-(2-piperidinoethyl) pyridine, (5) N-ethyl pyridinium bromide/ pyridine[1:1] ratio; and mixtures thereof, wherein the second solvent or swelling and gelling solvents of the first hydrophilic antistatic coating are present in an amount of from about 75 percent by weight to about 25 percent by weight are (1) methanol, (2) ethanol, (3) propanol, (4) propylene glycol, (5) butylene glycol and mixtures thereof, wherein the drying of the first hydrophilic layer is accomplished with incremental temperatures in the progressive drying zones set at temperatures of between 30 to 90° C. in the first drying zone, between about 80 to about 150° C. in the second drying zone, and between about 120 to about 200° C. in the third drying zone and the resident time of the hydrophilic first layer is between about 1 minute to about 4 minutes in each drying zone, and wherein the wet coating weight of the first hydrophilic antistatic coating is between about 20 grams/meter$^2$ to about 200 grams/meter$^2$; a coated xerographic paper wherein the total dry thickness of the first and second layer is between 0.5 microns to about 30 microns, and wherein the dry thickness of the third and fourth layer is between about 0.5 microns to about 30 microns; a coated xerographic substrate comprised of a substrate with four layers, two coating layers on the front side of the substrate and two coating layers on the reverse side of the substrate, wherein said front side coatings are comprised of a antistatic hydrophilic layer in contact with the substrate comprised of a blend of (1) a hydrophilic binder, (2) a water soluble filler, (3) a water insoluble filler, (4) an antistatic component (5) an optional filler dispersant, and (6) an optional biocide, and a second hydrophobic toner receiving coating situated on top of the first coating comprised of (1) a binder, (2) a toner wetting agent, (3) a lightfast UV absorber, (4) a lightfast antioxidant/antiozonant compound, and (5) a filler; and wherein said two coatings in contact with the reverse side of the substrate are comprised of a third hydrophilic antistatic coating comprised of (1) a binder polymer, (2) a water soluble filler, (3) a water insoluble filler, (4) an antistatic agent, (5) an optional filler dispersant and (6) an optional biocide, and a fourth toner receiving coating layer on top of the third hydrophilic coating comprised of (1) a latex binder, (2) a toner wetting agent, (3) a lightfast UV absorber, (4) a lightfast antioxidant compound, (5) a lightfast antiozonant compound, (6) filler, and (7) a biocide.

More specifically, substrates such as the papers of the present invention are comprised of a supporting substrate such as paper and thereover a first hydrophilic antistatic coating composition comprising (A) a hydrophilic polymer such as cellulose, #659, Scientific Polymer Products methylcellulose, (Methocel AM-4, Dow Chemical Company); hydroxypropyl methyl cellulose, (Methocel K35LV), Dow Chemicals; hydroxypropyl hydroxy ethyl cellulose, Aqualon Company and mixtures thereof, (B) water soluble fillers such as (1) inorganic salts such as sodium bisulfate, (Aldrich #30,782-3); sodium bisulfate monohydrate, (Aldrich #23,371-4); sodium ammonium hydrogen phosphate tetrahydrate, (Aldrich #24,350-7); sodium bisulfite, (Aldrich #24,397-3); sodium bromide, (Aldrich #22,034-5); sodium carbonate (Aldrich #22,232-1); sodium chloride, (Aldrich #31,016-6); sodium hexafluoro aluminate, (Aldrich #30,549-9); sodium hexafluoro silicate (Aldrich #25,017-1); sodium hydrogen carbonate, (Aldrich #34,094-4); (2) organic salts such as 2-keto butyric acid sodium salt monohydrate, (Aldrich #28,636-2); 2-keto glutaric acid monosodium salt, (Aldrich #27,170-5); pyruvic acid sodium salt (Aldrich #P7,622-5); 3-(trimethylsilyl) propionic acid sodium salt (Aldrich #18,033-5); (C) preferrably-a water insoluble filler or pigment dispersant such as alcohols such as pentaerythritol ethoxylate, (3/4 EO/OH), Aldrich #41,615-0; pentaerythritol ethoxylate, (15/4EO/OH), Aldrich #41,873-0; pentaerythritol propoxylate, (5/4PO/OH), Aldrich #41,874-9; pentaerythritol propoxylate (17/8PO/OH), Aldrich #41,875-7; pentaerythritol propoxylate/ ethoxylate, Aldrich #42,502-8; 2,2,3,3-tetrafluoro-1,4-butanediol, Aldrich #44,681-5; (D) an antistatic agent such as tetramethyl ammonium bromide (Aldrich #19,575-8), tetramethyl ammonium chloride (Aldrich #T1,952-6), tetramethyl ammonium iodide (Aldrich #23,594-6); polymethyl acrylate trimethyl ammonium chloride, such as HX42-1; (E) a water insoluble filler such as colloidal silica, calcium carbonate, clay and (F) a biocide such as poly(oxy ethylene(dimethylamino)-ethylene (dimethylamino) ethylenedichloride) (Busan 77, Buckman Laboratories Inc.), and lightfastness compounds.

The hydrophilic antistatic coating composition blend is preferrably dissolved and coated on to a substrate such as paper from a mixture of two or more solvents, such as three, wherein one of the solvents such as water is a solvent for the hydrophilic polymeric binder and the other solvent such as methanol, ethanol, propanol, acetone, ethyl acetate or mixtures thereof, is swelling/gelling agent (a component in which the polymer has limited solubility, for example about 0.25 to about 0.50 percent per 100 milliliters of solvent) for the hydrophilic polymeric binder. The proportion of the first solvent to the second of solvent varies from, for example, about 25 to about 75 percent by weight and the proportion of the second gelling solvent or mixtures thereof varies from for example about 75 to about 25 percent by weight, with a 50:50 mixture being preferred. The wet coating based, for example, on the pump speed, gap opening of the die, concentration of the coating solution, the speed of the coater and the area of the coating applied, to coating weight of the hydrophilic layer is generally between 20 grams/meter$^2$ to 200 grams/meter$^2$ resulting in a dry thickness of between about 6 microns to about 25 microns. The coatings are applied on the substrate on a coater such as a Faustel Coater equipped with an air dryer having three drying zones each of which can be set at different temperatures. After the gel composition has been applied on to paper the coatings are dried at for example about 20 to 25° C. in open air atmosphere prior to their entering an air dryer system set at incremental temperatures in the progressive drying zones such as, set at temperatures of between about 30 to 90° C. in the first drying zone, between about 80 to about 150° C. in the second drying zone, and between about 120 to about 200° C. in the third drying zone. The primary purpose of subjecting the gel coating to incremental-temperature-drying conditions is to preserve the gel structure, which structure is important for absorbing the unwanted fuser oil on the surface of paper after the coatings have been dried. The resident time of the wet coating is from about 30 seconds to about a minute from the time the coating is applied to the paper web and the time the paper web enters the air dryer, 1 minute to about 4 minutes in each drying zone depending on the speed of the coater, the higher the speed shorter the resident time.

The second toner receiving coating layer composition is preferably comprised of a blend of (a) a polymeric binder such as polyester resins, such as Vitel 2700, Vitel 5833, Shell Chemical Company; (b) a toner wetting agent which functions to primarily enhance the flow of toner during the imaging process such as isobutyl palmitate, Kessco IBP; octyl oxystearate, Kessco octyl oxystearate; ethyl pelargonate, cetearyl lactate, Crodamol CSL; cetearyl octanoate, Crodamol CAP; cetearyl palmitate, Crodamol CSP; cetearyl stearate, Crodamol CSS; (c) a lightfast UV agent, or s compound such as poly(4-hydroxy-2,2,6,6-tetramethyl-1-piperidine ethanol/dimethyl succinic acid), from Ciba-Geigy Corporation, poly(3,5-di-tert-butyl-4-hydroxy hydrocinnamic acid ester/1,3,5-tris(2-hydroxyethyl)-5-triazine-2,4,6(1H, 3H, 5H)-trione, Goodrich Chemicals; 2-hydroxy-4-(octyloxy) benzophenone, #41,315-1, Aldrich Chemical Company, 2-(4-benzoyl-3-hydroxy phenoxy)ethyl acrylate, #41,321-6, Aldrich Chemical Company, (d) lightfast antioxidant compound such as didodecyl 3,3'-thiodipropionate, Cyanox, LTDP, #D12,840-6, Aldrich Chemical Company; ditridecyl-3,3'-thiodipropionate, #41,311-9, Aldrich Chemical Company; ditetradecyl-3,3'-thiodipropionate, #41,312-7, Aldrich Chemical Company; dicetyl-3,3'-thiodipropionate, Evans Chemetics Corporation, (e) a lightfast antiozonant compound such as N-(1,3-dimethylbutyl)-N'-phenyl-phenylene diamine, Monsanto Chemicals, N,N'-di(2-octyl)-ρ-phenylene diamine, Vanderbilt Corporation, N,N'-bis(1,4-dimethyl pentyl)-ρ-phenylene diamine, Monsanto Chemicals, (f) a filler and a traction controlling agent such as zirconium oxide, silica, microspheres and the like; and whereas the blend of polyester, toner wetting agent, lightfast agents and the traction controlling agent can be dissolved and coated on to paper from a single solvent such as ethylacetate or toluene. The wet coating weight of the toner receiving layer is generally between 10 grams/meter$^2$ to 100 grams/meter$^2$ resulting in a dry thickness of between 2 microns to about 10 microns. The coatings are applied on to the substrate on a Faustel Coater, and these coatings are dried between 20 to 25° C. in open air atmosphere prior to their entering an air dryer set at temperatures of between 80 to 200° C. and preferably between 90 to 120° C. in the three drying zones to remove the solvent.

The third hydrophilic antistatic coating on the back, or reverse side of the paper is preferably comprised of (A) a hydrophilic cellulosic binder such as hydroxypropyl methyl cellulose, Dow Chemical Company, (B) a water soluble filler or pigment dispersant such as penta erythritol ethoxylate (3/4 EO/OH), Aldrich #41,615-0; (C) a cationic antistatic agent such as polymethyl acrylate trimethyl ammonium chloride, HX42-1, Interpolymer Corporation, (D) and a water insoluble filler, or pigment such as colloidal silica, titanium dioxide, and (E) a biocide such as cationic poly (oxyethylene(dimethylamino)-ethylene(dimethyl amino) ethylene dichloride) (Busan 77, Buckman Laboratories Inc.). The third hydrophilic antistatic coating composition blend can be dissolved and coated on to the substrate; such as paper from a mixture of two or more solvents where one of the solvents such as water is a solvent for the hydrophilic polymeric binder and the other solvent such as methanol, ethanol, propanol, acetone, ethyl acetate or mixtures thereof, are swelling and gelling agents for the hydrophilic polymeric binder. The proportion of the first solvent in the mixture of solvents varies from for example about 25 to about 75 percent by weight and the proportion of the gelling solvent or mixtures thereof is, for example, from about 75 to about 25 percent by weight. The wet coating weight of the hydrophilic layer is generally for example between about 20 grams/meter$^2$ to about 200 grams/meter$^2$ resulting in a dry thickness of, for example, between 6 microns to about 25 microns. The coatings can be applied on to the substrate on a coater such as a Faustel Coater equipped with an air dryer having three drying zones each of which can be set at different temperatures. After the gel composition has been applied on to paper on the coater, these coatings are dried for example, to about 20 to about 25° C. in open air atmosphere prior to their entering an air dryer system set at incremental temperatures in the progressive drying zones such as, set at temperatures of, for example, between about 30 to about 90° C. in the first drying zone, between for example, about 80 to about 150° C. in the second drying zone, and between, for example, about 120 to about 200° C. in the third drying zone. The wet coating weight of the third hydrophilic antistatic coating layer is generally for example, between about 40 grams/meter$^2$ to about 150 grams/meter$^2$ resulting and a dry thickness of between about 5 microns to about 20 microns (about, between about, etc. includes all numbers and values in between throughout).

The fourth traction controlling and toner receiving coating can be preferably applied on to a substrate, such as paper preferably from a water soluble or dispersible system comprising (A) a latex or water soluble polymer such as polyglycolide, polyglactin, water soluble polyesters, water based latex system such as sodiosulfo substituted anionic polyester latex Eastman AQ-29D prepared via condensation of an aromatic dicarboxylic acid with an aliphatic alcohol and the like. The other constituents of this water/latex based toner receiving layer are (B) toner wetting agents that are preferrably dispersible in water such as glyceryl isostearate, Emmerest 2410; glyceryl mono/ dilaurate, Aldo ML; glyceryl mono/dioleate Aldo MO; propyleneglycol myristate, Radiasurf 7196; sucrose di/tristearate, Ryoto Sugar Ester S-370; sorbitan palmitate, S-Maz-40; (C) lightfast UV absorbing agents such as poly[N,N-bis(2,2,6,6-tetramethyl-4-piperidinyl)-1,6-hexanediamine-co-2,4-dichloro-6-morpholino-1,3,5-triazine), Cyasorb UV-3346,#41,324-0, Aldrich Chemical Company; 1-[N-[poly(3-allyloxy-2-hydroxypropyl)-2-amino ethyl]-2-imidazolidinone, #41, 026-8, Aldrich Chemical Company, (D) lightfast antioxidants such as 2,6-di-tert-butyl-4-methyl phenol, Ultranox-226, from General Electric company; 2,6-di-tert-butyl-ρ-cresol, Vulkanox KB, Mobay Chemicals; 2,6-di-tert-butyl-α-dimethylamino-ρ-cresol, Ethanox 703, Ethyl Corporation; 2,2'-isobutylidene-bis(4,6-dimethyl phenol), Vulkanox NKF, Mobay Chemicals; 2,2'-methylenebis(6-tert-butyl-4-methylphenol), Cyanox 2246, #41,315-5, Aldrich Chemical Company; (E) lightfast antiozonants such as N-isopropyl-N'-phenyl-phenylene diamine, Santoflex-IP, Monsanto Chemicals; N-(1,3-dimethyl butyl)-N'-phenyl-phenylene diamine, Santoflex 13, Monsanto Chemicals; N,N'-di(2-octyl)-ρ-phenylene diamine, Antozite-1, Vanderbilt Corporation; N,N'-bis (1,4-dimethyl pentyl)-ρ-phenylene diamine, Santoflex 77, Monsanto Chemicals, (F) biocides such as nonionic biocides, such as 2-bromo-4'-hydroxyacetophenone, (Busan-90, Buckman Laboratories); 3,5-dimethyl tetrahydro-2H-1,3,5-thiadiazine-2-thione, (Slime-Trol RX-28, Betz Paper Chem Inc.; (a nonionic blend of 5-chloro-2-methyl-4-isothiazoline-3-one, 75 percent by weight, and 2-methyl-4-isothiazolin-3-one, 25 percent by weight), Amerstat 250 Drew Industrial Division; Nalcon 7647, Nalco Chemical Company; Kathon LX, Rohm and Haas Company); and the like, anionic biocides, such as anionic potassium N-hydroxy methyl-N-methyl-dithiocarbamate, (Busan-40, Buckman Laboratories Inc.); an anionic blend of methylene bis-thiocyanate, 34 percent by weight, sodium dimethyl-dithiocarbamate, 33 percent by weight, and sodium ethylene-bis-dithio carbamate, 33 percent by weight, (Amerstat 282, Drew Industrial Division); (G) and fillers and pigments such as colloidal silica, calcium carbonate, fluorescent pigments of coumarin derivatives. These coatings are dried at from about 20 to about 25° C. in open air atmosphere prior to their entering an air dryer set at temperatures of between about 90 to about 200° C. in three drying zones to remove water. The fourth traction controlling/toner receiving coating may also be applied on to paper from a solvent providing, for example it does not soften the second toner receiving layer.

The coated substrates, such as the xerographic papers of the present invention can comprise a substrate or base sheet having two coatings on both lateral surfaces thereof. Any suitable substrate can be employed, for example the substrate can be comprised of sized blends of hardwood kraft and softwood kraft fibers which blends contain from about 10 percent to 90 percent by weight of soft wood and-from about 90 to about 10 percent by weight of hardwood. Examples of hardwood include Seagull W dry bleached hardwood kraft preferably present, for example, in embodiments in an amount of about 70 percent by weight. Examples of softwood include La Tuque dry bleached softwood kraft present, for example, in one embodiment in an amount of about 30 percent by weight. These sized substrates may also contain fillers, wherein fillers refers for example, to substitutes for wood fibers to reduce the cost of the paper, and pigments that is, compounds to improve the brightness of papers in effective amounts of from about 1 to about 60 percent by weight such as the filler clay (Georgia Kaolin Company, Astro-fil 90 clay, Engelhard Ansilex clay), filler calcium silicate CH-427-97-8, XP-974 (J.M. Huber Corporation), titanium dioxide (Tioxide Company-Anatase grade AHR), and the like. Also, the sized substrates may contain various effective amounts of sizing chemicals (for example from about 0.25 percent to about 25 percent by weight of pulp) such as Mon size (Monsanto Company), Hercon-76 (Hercules Company), Alum (Allied Chemicals as Iron free alum), and retention aid (Allied Colloids as Percol 292). The sizing values of papers, including the commercial papers that can be selected for the present invention in an embodiment thereof, vary for example between about 0.4 second to about 4,685 seconds, however, papers in the sizing range of about 50 seconds to about 300 seconds are preferred, primarily to decrease costs. The porosity values of the substrates varies from about 100 to about 1,260 mil/minute and preferably from about 100 to about 600 mil/minute to permit, for example, the use of these papers for various printing technologies such as liquid toner development, xerography, ink jet processes, and the like.

Illustrative examples of commercially available, internally and externally (surface) sized substrates that may be selected for the present invention having a thickness of, for example, from about 50 microns to about 500 microns and preferably of a thickness of from about 100 microns to about 125 microns include Diazo papers, offset papers such as Great Lakes offset, recycled papers such as Conservatree, office papers such as Automimeo, Eddy liquid toner paper and copy papers from companies such as Nekoosa, Champion, Wiggins Teape, Kymmene, Modo, Domtar, Veitsiluoto and Sanyo with Xerox 4024™ papers and sized calcium silicate-clay filled papers being particularly preferred in view of their availability, and low print through. The substrate can also be opaque, including opaque plastics, such as TESLIN®, PPG Industries, and filled polymers, available from ICI, with fillers such as oxides and sulfates.

The first hydrophilic antistatic coating composition situated on the front of the substrate can comprise a binder polymer, a water soluble filler, such as hydroxypropyl methyl cellulose, (Methocel K35LV) Dow Chemicals; a water insoluble filler such as sodium bisulfate, (Aldrich #30,782-3); an antistatic agent, such as tetramethyl ammonium bromide (Aldrich #19,575-8), a filler or pigment dispersant such as pentaerythritol propoxylate, (5/4PO/OH), Aldrich #41,874-9; and an optional biocide such as poly (oxyethylene(dimethylamino)-ethylene(dimethylamino) ethylenedichloride) (Busan 77, Buckman Laboratories Inc.). Typically, the total thickness of this coating layer is from about 0.1 to about 25 microns and preferably from about 0.5 to 10 microns, although the thickness can be outside of these ranges. In the first porous coating composition the binder components can be present within the coating in any effective amount; typically the binder is present in amounts of from about 75 parts by weight to about 5 parts by weight and preferably from about 70 parts by weight to about 20 parts by weight, although the amounts can be outside of this range. The water soluble fillers of the first coating which include inorganic salts and organic salts, such as sodium carbonate are present in amounts of, for example, (amounts, thicknesses, and other numbers recited represent examples throughout), from about 5 parts by weight to about 40 parts by weight and preferably from about 4 parts by weight to about 30 parts by weight, although the amounts can be outside of this range. The antistatic components or mixture thereof such as tetramethyl ammonium bromide are present in the first coating composition in amounts of from about 10 parts by weight to about 1 part by weight and preferably from about 5 parts by weight to about 1 parts by weight, although the amounts can be outside of this range. The filler dispersant is present in the coating composition in amounts of from about 5 parts by weight to about 1 part by weight and preferably from about 3 parts by weight to about 0.5 parts by weight, although the amounts can be outside of this range. The water insoluble fillers of the first hydrophilic antistatic coating is present in amounts of from about 0.5 part by weight to about 52 parts by weight and preferably from about 16 part by weight to about 48 parts by weight, although the amounts can be outside of this range. The biocides of the first hydrophilic antistatic coating layer are present in amounts of from about 4.5 parts by weight to about 1 part by weight and preferably from about 2 parts by weight to about 0.5 part by weight, although the amounts can be outside of this range.

The aforementioned amounts can be determined, for example, as follows:

Various blends of binders, the water soluble fillers, cationic antistatic components, water insoluble filler or pigments second water insoluble, filler or pigment dispersants and biocides are generated in water and ethanol mixtures and coated on to various substrates such as paper using wire-wound rods (Gardco Applicator Rods also known as Meyer rods, Paul N. Gardner Company, Inc.) to yield papers with first layers thereover. These papers were further coated with a second toner receiving layer comprised of a binder, a toner wetting agent, a lightfast UV compound, a lightfast antioxidant compound, a lightfast antiozonant compound and a filler from ethyl acetate solution. After drying the xerographic papers at 100° C., these were tested for coating adhesion between the first and second layer, printed with a Xerox Corporation 5770™ color copier on the second toner receiving layer, for example, to check print quality, gloss values, lightfast values and curl. The data of coating adhesion between the first and second layer, print quality, gloss values, lightfast values of images on the toner receiving layer and paper curl obtained as a function of the coating composition was analyzed statistically for optimum range of compositions.

A preferred composition range for the first hydrophilic antistatic coating of the xerographic paper is the binder present in amounts of from about 70 parts by weight to about 20 parts by weight, the water soluble filler present in an amount of from about 4 parts by weight to about 30 parts by weight, the cationic antistatic components present in an amount of from about 5 parts by weight to about 1 parts by weight, the filler or pigments present in amounts of from about 16 parts by weight to about 48 parts by weight, the filler or pigment dispersants present in amounts of from about 3 part by weight to about 0.9 parts by weight, and the biocide compound present in amounts of from about 2 parts by weight to about 0.1 part by weight. The first hydrophilic antistatic coating composition comprised of (1) binder, (2) water soluble filler, (3) cationic antistatic components, (4) water insoluble filler or pigments, (5) filler and pigment dispersant, (6) biocide has the following preferred composition range based on total of 100 parts: (70+4+5+16+3+2=100) to (20+30+1+48+0.9+0.1=100).

A preferred composition range for the second hydrophobic toner receiving coating is the binder present in amounts of from about 50 parts by weight to about 20 parts by weight, the toner wetting agent present in an amount of from about 25 parts by weight to about 5 parts by weight, the lightfast UV absorber compound present in an amount of from about 8 parts by weight to about 0.5 parts by weight, the lightfast antioxidant compound present in an amount of from about 4 parts by weight to about 0.25 parts by weight, the lightfast antiozonant compound present in an amount of from about 4 parts by weight to about 0.25 part by weight and, the filler or pigment present in amounts of from about 13 parts by weight to about 74 parts by weight. This second toner receiving coating composition can be comprised of (1) binder, (2) a toner wetting agent, (3) lightfast UV absorber, (4) lightfast antioxidant compound, (5) lightfast antiozonant compound, (6) filler or pigment with the following preferred composition range based on total of 100 parts: (50+25+6+3+3 +13=100) to (20+5+0.5+0.25+0.25+74=100).

Examples of the first hydrophilic antistatic coating components situated in contact with the substrate are described for example, in U.S. Pat. No. 5,624,743, the disclosure of which is totally incorporated herein by reference, including water soluble polymers present in amounts of from about 75 parts by weight to about 5 parts by weight and preferably from about 70 parts by weight to about 20 parts by weight, such as preferrably hydroxypropyl methyl cellulose (Methocel K35LV, Dow Chemical Company), (1) cellulose

#659, #660, Scientific Polymer Products, (2) methyl cellulose (Methocel AM 4, Dow Chemical Company), (3) ethyl hydroxyethyl cellulose (Bermocoll, Berol Kem. A.B. Sweden), (4) hydroxypropyl methyl cellulose (Methocel K35LV, Dow Chemical Company), (5) hydroxy butylmethyl cellulose (such as HBMC, Dow Chemical Company), (6) dialkylammonium halide hydroxy alkyl cellulose, such as diethylammonium chloride hydroxy ethyl cellulose, available as Celquat H-100, L-200, National Starch and Chemical Company), (7) hydroxyalkyl trialkyl ammonium halide hydroxyalkyl cellulose, such as hydroxypropyl trimethyl ammonium chloride hydroxyethyl cellulose, Union Carbide Company as Polymer JR), (8) carboxy alkyl cellulose salts, such as sodium carboxymethyl cellulose CMC 7HOF, Hercules Chemical Company), (9) carboxyalkylhydroxyalkyl cellulose salts, such as sodium carboxymethylhydroxyethyl cellulose CMHEC 43H and 37L Hercules Chemical Company); (10) poly (acrylamide) (such as #02806, Poly Sciences Inc.), (11) acrylamide-acrylic acid copolymers (such as #04652, #02220, and #18545, Poly Sciences Inc.), (12) poly(ethylene oxide), such as POLY OX WSRN-3000, Union Carbide Corporation, mixtures thereof.

The water soluble fillers of the first hydrophilic antistatic coating of the present invention can be present in amounts of from about 5 parts by weight to about 40 parts by weight and preferably from about 4 parts by weight to about 30 parts by weight and are described in for example, U.S. Pat. No. 5,589,277, the disclosure of which is totally incorporated herein by reference, including ammonium salts such as (1) ammonium phosphate dibasic, (2) ammonium sulfate, (3) potassium bromide, (4) potassium sulfate, (5) potassium tetraborate tetrahydrate, (6) sodium bisulfate monohydrate, (7) sodium carbonate, (8) sodium chloride, (9) magnesium bromide hexahydrate, (10) magnesium chloride hexahydrate, (11) aluminum sulfatehexadeca hydrate, (12) aluminum potassium sulfate dodecahydrate, (13) barium hydroxide octahydrate, (14) calcium nitrate tetrahydrate, (15) calcium sulfate dihydrate, (16) strontium chloride hexahydrate, (17) zinc nitrate hexahydrate, (18) zinc sulfate hepta hydrate, all Aldrich chemicals; and preferrably sodium carbonate (Aldrich #22,232-1).

The water insoluble fillers of the first hydrophilic antistatic coating of the present invention present in amounts of, for example, from about 5 parts by weight to about 40 parts by weight and preferably from about 4 parts by weight to about 30 parts by weight include (1) ammonium citrate, (2) D-lactic acid lithium salt, (3) dodecyl sulfate lithium salt, (4) formic acid potassium salt, (5) citric acid, tripotassium salt monohydrate, (6) D-gluconic acid sodium salt, (7) citric acid trisodium salt dihydrate, (8) D,L-isocitric acid trisodium salt hydrate, (9) dodecyl sulfate sodium salt, (10) tetradecyl sulfate sodium salt, (11) octadecyl sulfate sodium salt, (12) α-D-glucose-1-phosphate disodium salt tetrahydrate, (13) pantothenic acid calcium salt monohydrate, (14) D-gluconic acid calcium salt, (15) 2 keto-D-gluconic acid, hemi calcium salt dihydrate, (16) 4-methyl-2-oxopentanoic acid calcium salt dihydrate, (17) 3-methyl-2-oxobutanoic acid calcium salt dihydrate, (18) calcium propionate, (19) D,L-glyceric acid calcium salt hydrate, (20) tricalcium dicitrate tetrahydrate, (21) choline chloride phosphate calcium salt, (22) D-gluconic acid magnesium salt, all Aldrich chemicals, with calcium propionate being preferred.

The antistatic components of the first hydrophilic antistatic coating composition present in amounts of from about 10 parts by weight to about 1 part by weight and preferably from about 5 to about 1 part by weight can be selected from monoammonium salts as disclosed in, for example, U.S. Pat. No. 5,320,902, the disclosure of which is totally incorporated herein by reference, including (1) tetradecyl ammonium bromide (Fluka 87582), (2) tetradodecyl ammonium bromide (Fluka 87249), (3) tetrahexadecyl ammonium bromide (Fluka 87298), (4) tetraoctadecyl ammonium bromide (Aldrich #35,873-8), and the like; (5) 2-coco trimethyl ammonium chloride (Arquad C-33, C-33W, C-50 from Akzo Chemie), (6) palmityl trimethyl ammonium chloride (Adogen 444 from Sherex Chemicals), (7) myristyl trimethyl ammonium bromide (Cetrimide BP Triple Crown America), (8) benzyl tetradecyl dimethyl ammonium chloride (Arquad DM 14B-90 from Akzo Chemie, (9) didecyl dimethyl ammonium bromide (Aldrich #29,801-8), (10) dicetyl dimethyl ammonium chloride (Adogen 432CG, Sherex Chemicals), (11) distearyl dimethyl ammonium methyl sulfate (Varisoft 137, 190-100P from Sherex Chemicals, Arosurf TA-100 Sherex Chemicals), (12) difatty acid isopropyl ester dimethyl ammonium methyl sulfate (Rewoquat CR 3099 from Rewo Quimica, Loraquat CR 3099 from Dutton and Reinisch), (13) tallow dimethyl trimethyl propylene diammonium chloride (Tomah Q-D-T from Tomah), (14) N-cetyl, N-ethyl morpholinium ethosulfate (G-263, ICI Americas), and the like, and preferrably cationic antistatic compounds.

Suitable cationic antistatic quaternary salts of the first hydrophilic antistatic coating are phosphonium compounds, such as, for example, those disclosed in copending application U.S. Ser. No. 08/034,917, the disclosure of which is totally incorporated herein by reference, including (1) bromomethyl triphenyl phosphonium bromide, (2) [3-hydroxy-2-methyl propyl]triphenyl phosphonium bromide, (3) 2 tetra phenyl phosphonium bromide, (4) tetra phenyl phosphonium chloride, (5) hexadecyl tributyl phosphonium bromide, (6) stearyl tributyl phosphonium bromide, all Aldrich chemicals. (7) quaternary ammonium block copolymers such as Mirapol A-15 and MirapoL WT, Miranol, Incorporated, Dayton, N.J., prepared as disclosed in U.S. Pat. No. 4,157,388, the disclosure of which is totally incorporated herein by reference, Mirapol AZ-1, Miranol, Inc., prepared as disclosed in U.S. Pat. No. 4,719,282, the disclosure of which is totally incorporated herein by reference, Mirapol AD-1, Miranol, Inc., prepared as disclosed in U.S. Pat. No. 4,157,388, Mirapol 9, Mirapol 95, and Mirapol 175, Miranol, Inc., Dayton, N.J., prepared as disclosed in U.S. Pat. No. 4,719,282, ammonium quaternary salts as disclosed in U.S. Pat. No. 5,320,902; phosphonium quaternary salts as disclosed in copending application U.S. Ser. No. 08/034,917 (D/92586); and sulfonium, thiazolium and benzothiazolium quaternary salts as disclosed in U.S. Pat. No. 5,314,747.

Other antistatic materials or compounds include (1) o-xylylene bis(triphenyl)phosphoniumbromide, (2) heptyltriphenylphosphonium bromide, (3) dodecyl triphenyl phosphonium bromide), (4) [3-(ethoxycarbonyl)-2-oxypropyl] triphenyl phosphonium chloride, (5) [3-(ethoxycarbonyl)-2-propyl]triphenyl phosphonium bromide, (6) benzyltriphenyl phosphonium bromide, (7) (ethoxy carbonyl methyl) dimethyl sulfonium bromide, (8) tetra octyl phosphonium bromide, (9) tetraethylammonium hexafluoro phosphate, (10) tetra butyl ammonium dihydrogen phosphate, (11) 1-propyl pyridinium bromide, (12) 2-propyl isoquinolinium bromide, (13) 1-phenacyl pyridinium bromide, (14) 1,3-didecyl-2-methylimidazolinium chloride, (15) (2-acryloyloxyethyl) (benzoyl benzyl) dimethyl ammonium bromide, Aldrich Chemicals.

Examples of the first hydrophilic antistatic coating fillers and pigments present in amounts of from about 0.5 part by weight to about 52 parts by weight and preferably from about 16 to about 48 parts by weight and described in U.S. Pat. No. 5,624,743, the disclosure of which is totally incorporated herein by reference, include (1) hollow microspheres such as Eccospheres MC-37 (sodium borosilicate glass), Miralite 177 (vinylidene chloride-acrylonitrile, Pierce & Stevens Chemical Corporation); (2) solid microspheres include Spheriglass E250P2 and 10002A (soda-lime glass A-glass, E-glass), Potters Industries; Micro-P (soda-lime glass), (3) solid plastic microspheres, Rohm & Haas, Dow Chemicals, Diamond Shamrock, and E.I. DuPont de Nemours & Company; (4) sodium metasilicate anhydrous available as Drymet 59, from Crossfield Chemicals, Incorporated, sodium metasilicate pentahydrate Crystamet 1020, Crystamet-2040, Crystamet-3080, from Crossfield Chemicals, Incorporated; (5) magnesium carbonate available as Elastocarb Tech Light, from Morton International; (6) colloidal silicas, such as Syloid 74, Grace Company, (7) barium sulfate (K.C. Blanc Fix HD80, Kali Chemie Corporation), (8) calcium carbonate (Microwhite Sylacauga Calcium Products), high brightness clays (such as Engelhard Paper Clays), (9) brightener fluorescent pigments of Coumarin derivatives such as Formula #633, Polymer Research Corporation Of America; (10) fluorescent pigments of Oxazole derivatives such as Formula #733, Polymer Research Corporation Of America.

Examples of the first hydrophilic antistatic coating layer filler or pigment dispersants present in amounts of from about 5 parts by weight to about 1 part by weight and preferably from about 3 to about 0.9 part by weight include (1) pentaerythritol ethoxylate (3/4 EO/OH, Aldrich #41,615-0), (2) pentaerythritol ethoxylate (15/4 EO/OH, Aldrich #41,873-0), (3) pentaerythritol propoxylate (5/4 PO/OH, Aldrich #41,874-9), (4) pentaerythritol propoxylate (17/8 PO/OH, Aldrich #41,875-7), (5) pentaerythritol propoxylate/ethoxylate, (Aldrich #42,502-8); (6) 2,2,3,3-tetrafluoro-1,4-butanediol, Aldrich #44,681-5; (7) 2,2,3,3,4,4,5,5,6,6,7,7,8,8,9,9,10,10,10-nonadecafluoro-1-decanol, (Aldrich #44,631), (8) 2,2'-[4-(2-hydroxyethylamino)-3-nitrophenylimino] diethanol, Aldrich #41,894-3; (9) 2,2,3,3,4,4-hexafluoro-1,5-pentanediol, (Aldrich #H880-3), (10) allyl alcohol 1,2-butoxylate-block-ethoxylate (Aldrich #43,312-8).

Examples of suitable biocides of the first hydrophilic antistatic coating layer present in amounts of from about 4.5 parts by weight to about 1 part by weight and preferably from about 2 to about 0.1 part by weight include (A) nonionic biocides, such as 2-bromo-4'-hydroxyacetophenone, (Busan 90, Buckman Laboratories); 3,5-dimethyl tetrahydro-2H-1,3,5-thiadiazine-2-thione (Slime-Trol RX-28, Betz Paper Chem Inc.; (a nonionic blend of 5-chloro-2-methyl-4-isothiazoline-3-one, 75 percent by weight, and 2-methyl-4-isothiazolin-3-one, 25 percent by weight), (available as Amerstat 250 from Drew Industrial Division; Nalcon 7647, from Nalco Chemical Company; Kathon LX, from Rohm and Haas Company); and the like, as well as mixtures thereof; (B) anionic biocides, such as anionic potassium N-hydroxymethyl-N-methyl-dithiocarbamate (available as Busan 40 from Buckman Laboratories Inc.); an anionic blend of methylene bis-thiocyanate, 34 percent by weight, sodium dimethyl-dithiocarbamate, 33 percent by weight, and sodium ethylene bisdithiocarbamate, 33 percent by weight, (available as Amerstat 282 from Drew Industrial Division; AMA-131 from Vinings Chemical Company); (6) sodium dichlorophene (G-4-40, Givaudan Corporation); and the like, as well as mixtures thereof; (C) cationic biocides, such as cationic poly(oxyethylene (dimethylamino)-ethylene (dimethylamino)ethylene dichloride) (Busan 77, Buckman Laboratories Inc.); a cationic blend of bis(trichloromethyl) sulfone and a quaternary ammonium chloride (available as Slime-Trol RX-36 DPB-865 from Betz Paper Chem. Inc.); and the like, as well as mixtures thereof. The biocide can be present in any effective amount; typically, the biocide is present in an amount of from about 0.1 percent by weight to about 3 percent by weight, although the amount can be outside this range.

Solvents selected for the first hydrophilic antistatic coating include: (1) water, (2) lactic acid 85 percent solution in water, (3) formic acid, (4) trifluoroacetic acid, (5) formamide, (6) 4-formyl morpholine, (7) pyridine, (8) 2-(2-piperidinoethyl)pyridine, all from Aldrich chemicals, (9) N-ethylpyridinium bromide (Alfa #A17911)tpyridine [1:1] ratio, (10) N-ethylpyridinium bromide (Alfa #A17911)/formamide [1:1] ratio, and the swelling/gelling solvents of the first hydrophilic antistatic coating include (1) methanol (2) ethanol, (3) propanol, (4) isopropanol, (5) n-butanol, (6) secbutanol, (7) 1-pentanol, (8) 2-pentanol, (9) 3-pentanol, (10) 1-hexanol, (11) 2-hexanol, (12) 3-hexanol, (13) 1-heptanol, (14) 2-heptanol, (5) 3-heptanol, (16) 1-octanol, (17) 2-octanol, (18) 1-nonanol, (19) 2-nonanol, (20) 1-decanol, (21) ethylene glycol, (22) propyleneglycol, (23) trimethyleneglycol, (24) 1,2-butylene glycol, (25) 1,3-butyleneglycol, (26) 1,4-butyleneglycol, (27) 1,2-pentane diol, (28) 1,5-hexane diol, all Aldrich chemicals.

The second toner receiving coating composition situated on the top of the first hydrophilic antistatic coating can be comprised of a (1) binder, (2) a toner wetting agent, (3) a lightfastness UV absorber, (4) a lightfastness antioxidant compound, (5) a lightfast antiozonant compound and a (6) filler or pigment. Typically, the total thickness of this coating layer is from about 0.1 to about 25 microns and preferably from about 0.5 to 10 microns, although the thickness can be outside of these ranges. In the second coating composition the binder components can be present within the coating in any effective amount; typically the binder is present in amounts of from about 53 parts by weight to about 5 parts by weight and preferably from about 50 parts by weight to about 20 parts by weight, although the amounts can be outside of this range. The toner wetting agent is present in an amount from about 30 parts by weight to about 5 parts by weight and preferably of from about 25 parts by weight to about 5 parts by weight, although the amounts can be outside of this range. The lightfast UV absorber compound is present in an amount of from about 8 parts by weight to about 0.5 parts by weight and preferably from about 6 parts by weight to about 0.5 parts by weight, although the amounts can be outside of this range. The lightfast antioxidant compound is present in an amount of from about 4 parts by weight to about 0.25 part by weight and preferably from about 3 parts by weight to about 0.25 part by weight, although the amounts can be outside of this range. The lightfast antiozonant compound is present in an amount of from about 4 parts by weight to about 0.25 part by weight and preferably from about 3 parts by weight to about 0.25 part by weight, although the amounts can be outside of this range. The filler or pigment is present in amounts of from about 1 part by weight to about 89 parts by weight and preferably from about 13 parts by weight to about 74 parts by weight although the amounts can be outside of this range.

Examples of suitable binders for the second toner receiving layer include polyesters, and other suitable binders. Binder examples are:

(1) polyethylene terephthalate resins, Rynite, E.I. DuPont de Nemours and Company, (2) Aropol polyester resins,

#Q-6585, Ashland Chemical Company, (3) polyarylates resins, Ardel D-100, Union Carbide Company, (4) polybutylene terephthalate based ester resins, Celanex, Celanese Corporation, (5) branched saturated polyester resin Vitel 5833 [CAS #112864-14-9; melting point=71° C. ;Mw=9800, Mn=4600] and other Vitel polyester resins such as Vitel 1000 series, Vitel 2000 series, Vitel 3000 series, Vitel 4000 series, Vitel 5000 series, Shell Chemical Company, (6) Bisphenol-A fumarate polyester resins #E-750, Owens-Corning Fiberglass Corporation, (7) rosin modified maleic polyester resins #PA-55-004 Polymer Applications Incorporated, (8) polyester azelate, Merrol #P-9500 and #P-1030 LV, Merrand International Corporation, (9) polyester glutarate, Merrol #P-5510, (10) polyester nylonate, Merrol #P-5511, (11) polyester phthalate, Merrol #P-8425, Merrand International Corporation, (12) poly(ethylene adipate) #147, (13) Koly(ethylene succinate) #149, (14) poly(ethylene azelate) #842, (15) poly(1,4-butylene adipate) #150, (16) poly(trimethylene adipate) #594, (16) poly (trimethylene glutarate) #591, (17) poly(trimethylene succinate) #592, (18) poly(hexamethylene succinate), (19) poly(diallyl phthalate) #010, (20) poly(diallyl isophthalate) #011, all Scientific Polymer Products (21) thiodipropionate polyester available as TDP 2000, Eastman Chemicals company, (22) Resapol HT linear polyester, Rezana Brazil, (23) crosslinked Resapol HT, with a degree of crosslinking ranging between 5 to about 40 percent, obtained via reactive extrusion process as described in U.S. Pat. No. 5,227,460, (24) polyester-ether resins, Hytrel from E.I. DuPont de Nemours and Company, (25) polyester-co-polycarbonate resins, APE KLI-9306, APE KLI-9310, Dow Chemical Company, (26) cellulose acetate hydrogen phthalate #085, Scientific Polymer Products, (27) hydroxypropylmethyl cellulose phthalate, HPMCP, and (28) hydroxypropyl methyl cellulose succinate, HPMCS, Shin-Etsu Chemical, (29) cellulose acetate butyrate #077, and (30) cellulose propionate #2052, Scientific Polymer Products. A branched saturated polyester resin Vitel 5833 [CAS #112864-14-9; melting point=71° C.;Mw=9800, Mn=4600] is preferred.

The toner wetting agents of the second toner receiving layer include low molecular weight ester compounds including:

(A) monoalkyl esters such as (1) methyl eicosonate, Kemester 2050; methyl soyate, Kemester 226; methyl tallowate, Kemester 143; methyl oleate/linoleate, Kemester 213; tetrahydrofurfuryl oleate, Kemester THFO; Witco/Humko company, (2) methyl stearate, Stepan C 66; methyl myristate, Stepan C 50; methyl oleate, Stepan C 68; octyl palmitate, Kessco octyl palmitate; octyl oxystearate, Kessco octyl oxystearate; Stepan Company, (3) ethyl pelargonate, Carsemol A-500; Lonza Incorporated isopropyl myristate, Radia 7190; isopropyl myristo palmitate, Radia 7220; isopropyl oleate, Radia 7231; isopropyl palmitate, Radia 7200; isooctyl stearate, Radia 7130, Radia 7131; Oleofina Belgium, (4) isobutyl palmitate, Kessco IBP; Lonza Incorporated, isobutyl oleate, Rilanit IBO; isobutyl stearate, Rilanit IBS; isobutyl tallowate, Rilanit IBTI; methyl dimerate, Emery 2902; myristyleicosyl stearate, Standmul G-3236 stearate; octadodecanol stearate Cetiol G 20S; oleyl erucate Cetiol J 600; oleyl oleate Rilanit OLO; cetearyl isononanoate, Cetiol SN; stearoyl stearate, Rilanit STS-T; Henkel corporation, (5) cetearyl lactate, Crodamol CSL; cetearyl octanoate, Crodamol CAP; cetearyl palmitate, Crodamol CSP; cetearyl stearate, Crodamol CSS; stearyl heptanoate, Crodamol W; Croda Incorporated, (6) isononyl oleate, Radia 7330; isononyl stearate, Radia 7510; (20) behenyl erucate, Schercemol BE; decyl oleate, Schercemol DO; cetyl lactate, Schercemol CL; cetyl myristate, Schercemol CM; cetyl octanoate, Schercemol CO; cetyl palmitate, Schercemol CP; cetyl stearate, Schercemol CS; decyl isostearate, Schercemol DEIS; erucyl erucate, Schercemol SE; isostearyl erucate, Schercemol; isostearyl/erucyl erucate, Scheroba oil; isostearyl isostearate, Schercemol 1818; isostearyl neopentanoate, Schercemol 185; isostearyl stearoyl stearate, Schercemol 1SS; myreth-3-laurate, Schercemol MEL-3; myreth-3-myristate, Schercemol MEM-3; myreth-3-palmitate, Schercemol MEP-3; myristyl lactate, Schercemol ML; myristyl myristate, Schercemol MM; myristyl propionate, Schercemol MP; myristyl stearate, Schercemol MS; octyl pelargonate, Schercemol OPG; Scher Chemicals Incorporated, (7) arachidyl behenate, Waxenol 822; arachidyl propionate, Waxenol 801; butylacetyl ricineolate, Flexricin P-6; butylacetoxy stearate, Paricin 6; cetyl ricinioleate, Nature Chem CR; isodecyl isononanoate, Wickenol 152; isononyl isononanoate, Wickenol 151; isopropyl isostearate, Wickenol 131; methyl ricinioleate, Flexricin P-1; methyl octanoate, Wickenol 174; Cas Chem Incorporated, (8) cetyl isooctanoate, Tegosoft 168; isooctadecyl isononanoate, Tegosoft 169; all being TH. Goldschmidt AG. Germany, (9) octadodecyl myristate, Exceparl OD-M; octadodecyl oleate, Exceparl OD-OL; Kao Corporation, (10) octadecyl stearate, Starfol ODS; Sherex Chemical Company, (11) 1,4-cyclohexane dimethanol dibenzoate, Benzoflex 352; Velsicol Chemical Company, (12) cumyl-phenyl benzoate, Kenplast ESB; cumyl-phenyl neodecaonoate, Kenplast ESN; Kenrich Petrochemical Company; of these isobutyl palmitate, Kessco IBP; Lonza Incorporated, is preferred;

(B) dialkyl esters (1) dibutyl adipate, Cetiol B, Rilanit DBA; dihydrogenated tallow phthalate, Rilanit DTP; diisotridecyl phthalate, Edenol W 300S; dimethyl azelate, Emery 2914; 2-ethylhexyl tallowate, Rilani0t EHTI; Henkel corporation, (2) dioctyl dilinoleate, Kemester 3681; ditridecyl adipate, Kemester 5654; ditridecyl dilinoleate, Kemester 3684; Witco/Humko company, (3) diisobutyl adipate, Plasthall DIBA; diisobutyl azelate, Plasthall DIBZ; diisodecyl adipate, Plasthall DIDA; diisooctyl dodecanedioate, Plasthall DIODD; dioctyl dodecanedioate dioleate, Plasthall DODD; dioctyl sebacate, Plasthall DOS; all being C.P Hall Company, (4) diallyl fumarate, SR-204 Sartomer Company, (5) diallyl phthalate, Cadox M-30; Akzo Chemicals Incorporated, (6) diisodecyl phthalate, Vinyzene Bp-505 DIDP Morton International, (7) dimethyl adipate, DBE-2, DBE-3, DBE-9; dimethyl succinate, DBE-4, E.I. DuPont de Nemours and Company Incorporated, (8) dicapryl adipate, Uniflex DCA; dicapryl phthalate, Uniflex DCP; Union Camp Corporation, (9) dibutyl phthalate, Unimoll DB; dibutyl sebacate Unimate DBS; dicyclohexyl phthalate, Unimate 66-M; from Bayer A.G. Germany, (10) dibutyl maleate, Staflex DBM; dibutyl fumarate, Staflex DBF; diisononyl adipate, Staflex DINA; diisononyl maleate, Staflex DINM; diisooctyl adipate, Staflex DIOA; diisooctyl maleate, Staflex DIOM; diisooctyl phthalate, Staflex DIOP; dimethyl phthalate, Staflex DMP; dioctyl adipate, Staflex DOA; dioctyl azelate, Staflex DOZ; dioctyl fumarate, Staflex DOF; dioctyl maleate, Staflex DOM; diisooctyl phthalate Staflex DIOP; ditridecyl maleate Staflex DTDM; ditridecyl phthalate, Staflex DTDP; n-octyl-n-decyl adipate, Staflex NODA; n-octyl-n-decyl phthalate, Staflex ODP; n-octyl-n-decyl trimellitate, Staflex NONDTM; Reichhold Chemicals Incorporated, (11) distearyl phthalate, Radiasurf 7505; 2-ethylhexyl laurate, Radia 7127; 2-ethylhexyl oleate, Radia 7331; Oleofina Belgium, (12) diisodecyl nylonate/glutarate, Merrol DIDN; diisooctyl adipate, Merrol DIOA; Merrand International Corporation, (13) dioctyl terephthalate, Kodaflex DOTP; Eastman Chemical Company, (14) diisocetyl adipate, Schercemol DICA; diisopropyl adipate, Schercemol DIA; diisopropyl dimerate, Schercemol DID; diisopropyl sebacate, Schercemol DIS; diisostearyl dilinoleate, Schercemol DISD; Scher Chemicals Incorporated, (15) octyl dodecyl stearate, Starfol OS; Sherex Chemical Company with dioctyl dodecanedioate dioleate, Plasthall DODD; being preferred;

(C) trialkyl esters (1) octyl dodecyl stearoyl stearate, Ceraphyl 847; tridecyl neopentanoate, Ceraphyl 55; Van Dyk, division of Mallinckrodt company, (2) tri n-hexyl trimellitate, Merrol 600TM; triisooctyl trimellitate, Merrol TIOTM; Merrand International Corporation, (3) trioctyl trimellitate, Kodaflex TOTM; Eastman Chemical Company, (4) triisocetyl citrate, Hetester TICC Witco/Humko company, (5) triisopropyl trilinoleate, Schercemol TT; triisostearyl trilinoleate, Schercemol TIST; Scher Chemicals Incorporated, triethanolamine dioleate, Rilanit TDO; trihydroxy methoxy stearin, Cetiol R; Henkel corporation, trioctyl trimellitate, Kodaflex TOTM; Eastman Chemical Company, being preferred;

(D) alkyl triesters (1) caprylic triglyceride, Captex 8000; caprylic/capric /lauric triglycerides, Captex 350; caprylic/capric diglyceryl succinate, Miglyol 829; caprylic/capric glycerides, Imwitor 742; caprylic/capric/isostearic/adipic triglycerides, Softisan 649; caprylic/capric/linoleic triglycerides, Miglyol 818; caprylic/capric triglycerides, Miglyol 810; caprylic/capric/stearic triglycerides, Softisan 378; Huls America Incorporated, with caprylic/capric/linoleic triglycerides, Miglyol 818 being preferred;

(E) pentaerythritol esters (1) pentaerythritol tetra caprylate/caprate, Crodamol PTC; pentaerythritol tetra isostearate, Crodamol PTIC; Croda Incorporated, (2) pentaerythritol tetra behenate, Radia 7514; pentaerythritol tetra C5/C9, Radiasyn 7174; pentaerythritol tetra C7, Radiasyn 7177; pentaerythritol tetra C8/C10, Radiasyn 7178; pentaerythritol tetraoleate, Radia 7171; pentaerythritol tetrastearate, Radia 7176; Oleofina Belgium, (3) pentaerythritol hydrogenated rosinate, Pentalyn H; pentaerythritol rosinate, Pentalyn 830, Pentalyn 856-A, Hercules Incorporated, (4) pentaerythritol tetrapelargonate, Emerest 2485 Emerest 2486; Henkel corporation, (5) pentaerythritol ricinioleate, Flexricin 17; Cas Chem Incorporated, (6) pentaerythritol tetrabenzoate, Benzoflex S-552; Velsicol Chemical Company. Pentaerythritol rosinate with Pentalyn 830, Hercules Incorporated, being preferred;

(F) alkoxy esters (1) butoxyethyl oleate, Merrol 4218; dibutoxyethoxy ethyl adipate, Merrol 4226; dibutoxyethoxy ethyl phthalate, Merrol 4228; dibutoxyethoxy ethyl sebacate, Merrol 4226; dibutoxyethoxy ethyl phthalate, Merrol 4220; dibutoxy ethyl adipate, Merrol 4206; dibutoxy ethyl phthalate, Merrol 4208; dibutoxy ethyl sebacate, Merrol 4200; epoxidized tallate, Merrol E-45; glycol ether glutarate, Merrol 4425; Merrand International Corporation, (2) dimethoxy ethyl phthalate, Kodaflex DMEP; dibutoxyethoxy ethyl glutarate, Plasthall DBEEG; dibutoxy ethyl azelate, Plasthall DBEZ; dibutoxy ethyl glutarate, Plasthall DBEG; Eastman Chemical Company, (3) behenoxy dimethicone, Abil-Wax 2440; TH. Goldschmidt AG Germany, with Glycol ether glutarate, Merrol 4425; Merrand International Corporation being preferred;

(G) peroxy ester compounds (1) t-butyl peroxy crotonate Esperox 13M; t-butylperoxy neodecanoate Esperox 33M; t-butylperoxy neoheptanoate Esperox 750M; t-butylperoxy pivlate Esperox 31M; tert-butylperoxy 2-methylbenzoate, Esperox 497M; Witco/Argus Chemicals; (2) tert-butyl peroxyneo hexanoate Lupersol 750M; tert-butyl peroctate Lupersol P-31, Lupersol PDO, Lupersol PMS; α-cumyl peroxyneodecanoate Lupersol 188M75; α-cumyl peroxyneoheptanoate Lupersol 288M75; α-cumyl peroxy pivalate Lupersol-47M75; di-tert-butyl diperoxy azelate Lupersol-99; di-tert-butyl diperoxy phthalate Lupersol-KDB; 1,1-dimethyl-3-hydroxybutylperoxy-2-ethyl hexano ate Lupersol-665T50; 1,1-dimethyl-3-hydroxybutyl peroxy neoheptanoate Lupersol-677T50; dioctyl peroxy dicarbonate, Lupersol 223, Lupersol 223-M, Lupersol 223-M 40, Lupersol 223-M 75, Lupersol 223-T70, ATO Chem, France; and mixtures thereof, with tert-butylperoxy 2-methylbenzoate, Esperox 497M; Witco/Argus Chemicals being preferred.

The toner receiving layer can contain lightfast agents, or compounds comprised of for example, three compounds such as a UV absorbing compound, an antioxidant compound and an antiozonant compound. The lightfast UV absorber compound is present in an amount of from for example about 8 parts by weight to about 0.5 part by weight, the lightfast antioxidant compound is present for example in an amount of from about 4 parts by weight to about 0.25 part by weight, the lightfast antiozonant compound is present for example in an amount of from about 4 parts by weight to about 0.25 part by weight. These lightfast agents are disclosed in U.S. Pat. No. 5,624,743, the disclosure of which is totally incorporated herein by reference.

Examples of lightfast agents are UV absorbing compounds like (1) poly(4-hydroxy-2,2,6,6-tetramethyl-1-piperidine ethanol/dimethyl succinic acid), Ciba-Geigy Corporation, (2) 2-hydroxy-4-(octyloxy)benzophenone, Cyasorb-UV-531, #41,315-1, (3) poly[2-(4-benzoyl-3-hydroxyphenoxy)ethyl acrylate] (Cyasorb UV-2126, #41, 323-2, (4) poly[N,N-bis(2,2,6,6-tetramethyl-4-piperidinyl)-1,6-hexanediamine-co-2,4-dichloro-6-morpholino-1,3,5-triazine), Cyasorb UV-3346, #41,324-0, (5) 1-[N-[poly(3-allyloxy-2-hydroxypropyl)-2-amino ethyl]-2-imidazolidinone, #41,026-8, all from Aldrich Chemical Company; lightfast antioxidant compounds examples are (1) didodecyl-3,3'-thiodipropionate, Cyanox, LTDP, #D12,840-6, (2) ditridecyl-3,3'-thiodipropionate, Cyanox-711, #41, 311-9, both Aldrich Chemical Company, (3) 2,6-di-tert-butyl-4-methyl phenol, ultranox 226, General Electric company, (4) 2,6-di-tert-butyl-ρ-cresol, Vulkanox KB, Mobay Chemicals, (5) 2,6-di-tert-butyl-α-dimethylamino-ρ-cresol, Ethanox 703, Ethyl Corporation; and lightfast antiozonant examples are (1) N-isopropyl-N'-phenyl-phenylene diamine, Santoflex-IP, (2) N-(1,3-dimethylbutyl)-N'-phenyl-phenyl enediamine, Santoflex-13, (3) N,N'-bis-(1, 4-dimethylpentyl)-ρ-phenylenediamine, Santoflex-77, all from Monsanto Chemicals, (4) N,N'-di(2-octyl)-ρ-phenylene diamine, Antozite-1, Vanderbilt Corporation.

The fillers of the second toner receiving coating may be selected from the group of filler materials used in the preparation of the first coating layer, such as colloidal silica, zirconium oxide and the like.

Typically, the total thickness of the third hydrophilic antistatic coating layer present on the back of the substrate is from about 0.1 to about 25 microns and preferably from about 0.5 to 10 microns, although the thickness can be outside of these ranges. This third hydrophilic antistatic coating composition situated on the back of the substrate, comprises a binder polymer, a water soluble filler, a water insoluble filler or pigment, an antistatic agent, a filler or pigment dispersant and an optional biocide. Typically, the total thickness of this coating layer is from about 0.1 to about 25 microns and preferably from about 0.5 to 10 microns, although the thickness can be outside of these ranges. In the third hydrophilic antistatic coating composition the binder components can be present within the coating in any effective amount; typically the binder is present in amounts of from about 75 parts by weight to about 5 parts by weight and preferably from about 70 parts by weight to about 20 parts by weight, although the amounts can be outside of this range. The water soluble fillers of the third coating include inorganic salts and organic salts, present in amounts of from about 5 parts by weight to about 40 parts by weight and preferably from about 4 parts by weight to about 30 parts by weight, although the amounts can be outside-of this range. The antistatic components or mixture thereof are present in the third coating composition in amounts of from about 10 parts by weight to about 1 part by weight and preferably from about 5 parts by weight to about 1 parts by weight, although the amounts can be outside of this range. The filler or pigment dispersant are present in the coating composition in amounts of from about 5 parts by weight to about 1 part by weight and preferably from about 3 parts by weight to about 0.5 part by weight, although the amounts can be outside of this range. The filler of the third hydrophilic layer is present in amounts of from about 0.5 part by weight to about 52 parts by weight and preferably from about 16 part by weight to about 48 parts by weight, although the amounts can be outside of this range. The biocides of the third layer coating composition are present in amounts of from about 4.5 parts by weight to about 1 part by weight and preferably from about 2 parts by weight to about 0.5 part by weight, although the amounts can be outside of this range.

The binder polymer, water soluble filler, water insoluble filler, antistatic agent, filler or pigment dispersant and the biocides of the third hydrophilic antistatic coating composition layer may be selected from the materials of the first layer. In one embodiment the third hydrophilic coating on the back side of paper is comprised of (A) a hydrophilic cellulosic binder such as hydroxypropyl cellulose, Hercules Chemical Company, (B) a filler or pigment dispersant such as pentaerythritol ethoxylate, (3/4 EO/OH), Aldrich #41, 615-0; pentaerythritol ethoxylate, (15/4EO/OH), Aldrich #41,873-0; pentaerythritol propoxylate, (5/4 PO/OH), Aldrich #41,874-9; pentaerythritol propoxylate (17/8 PO/OH), (C) a cationic antistatic agent such as polymethyl acrylate trimethyl ammonium chloride, HX42-1, Interpolymer Corp., quaternary block copolymers such as Mirapol AD-1 AZ-1, Miranol incorporated, (D) a filler or pigment such as colloidal silica, titanium dioxide, oxazole based fluorescent pigment and (E) a biocide such as cationic poly(oxyethylene (dimethylamino)-ethylene(dimethyl amino)ethylene dichloride) (Busan 77, Buckman Laboratories Inc.).

The fourth toner receiving coating layer situated on the top of the third hydrophilic antistatic coating can be comprised of (1) a latex binder, (2) a toner wetting agent, (3) a lightfast UV absorber, (4) a lightfast antioxidant compound, (5) a lightfast antiozonant compound, (6) filler or pigment, and (7) a biocide. Typically, the total thickness of this coating layer is from about 0.1 to about 25 microns and preferably from about 0.5 to 10 microns, although the thickness can be outside of these ranges. In the fourth coating composition the latex binder can be present within the coating in any effective amount; typically the binder is present in amounts of from about 50 parts by weight to about 5 parts by weight and preferably from about 50 parts by weight to about 20 parts by weight, although the amounts can be outside of this range. The toner wetting agent is present in an amount from about 30 parts by weight to about 5 parts by weight and preferably of from about 25 parts by weight to about 5 parts by weight, although the amounts can be outside of this range. The lightfast UV absorber compound is present in an amount of from about 8 parts by weight to about 0.5 part by weight and preferably from about 6 parts by weight to about 0.5 part by weight, although the amounts can be outside of this range. The lightfast antioxidant compound is present in an amount of from about 4 parts by weight to about 0.25 part by weight and preferably from about 3 parts by weight to about 0.25 part by weight, although the amounts can be outside of this range. The lightfast antiozonant compound is present in an amount of from about 4 parts by weight to about 0.25 part by weight and preferably from about 3 parts by weight to about 0.25 part by weight, although the amounts can be outside of this range. The filler or pigment is present in amounts of from about 1 part by weight to about 88.9 parts by weight and preferably from about 11 parts by weight to about 73 parts by weight although the amounts can be outside of this range. The biocide is present in an amount of from about 3 parts by weight to about 0.1 part by weight and preferably from about 2 parts by weight to about 1 part by weight, although the amounts can be outside of this range.

The anionic latex binders of the fourth toner receiving coating layer present in amounts of from about 50 to about 5 parts by weight and preferably from about 50 to about 20 parts by weight include (1) biodegradable polyester resins such as polyglycolide, Dexon, American Cyanamid Company, (2) polyesters of lactic acid, such as polyglactin 910, Vicryl XLG, both being Ethicon Company, (3) water soluble polyesters such as titanium derivatives of polyesters such as Tyzor, E.I. DuPont de Nemours and Company, (4) polyester prepared by the reaction of an aliphatic glycol and an aromatic dicarboxylic acid and substituted with sodiosulfo groups is further dispersed in water to yield a latex available as Eastman AQ 29D, Eastman Chemical Company; (5) styrene-butadiene latexes, RES 4040 and RES 4100, Unocal Chemicals, (6) styrene-butylacrylate copolymer emulsions and their modifications with waxes as described in U.S. Pat. No. 5,482,812, the disclosure of which is totally incorporated herein by reference, (7) butadieneacrylonitrile-styrene terpolymer latex, Tylac synthetic rubber latex 68-513, Reichhold Chemicals Inc., (8) butadiene-styrene-2-vinyl pyridine terpolymer latex, Pyratex J 1904, Bayer AG, Germany, (9) styrene-acrylic copolymer emulsion-Texicryl 13-030, Scott Badar, (10) styrene-acrylate copolymer emulsions, from Pennwalt Corporation, (11) ethylene-vinylacetate latex (Airflex 400, Air Products and Chemicals Inc.), (12) vinyl acetate-acrylic copolymer latexes (such as synthemul 97-726, Reichhold Chemical, and (13) acrylic emulsion, Rhoplex B15 -J, Roham and Haas. One preferred latex is the polyester latex prepared by the reaction of an aliphatic glycol and an aromatic dicarboxylic acid and substituted with sodiosulfo groups, dispersed in water to yield a latex available as Eastman AQ 29D, Eastman Chemical Company is preferred.

The toner wetting agents of the fourth traction controlling/toner receiving coating present in amounts of from about 30 to about 5 parts by weight and preferably from about 25 to about 5 parts by weight include:

(A) glyceryl esters (1) glyceryl isostearate, Emmerest 2410; glyceryl mono/ dilaurate, Aldo ML; glyceryl mono/dioleate Aldo MO; Lonza Incorporated, (2) glyceryl dilaurate, Cithrol GDL N/E, Cithrol GDL S/E; glyceryl dioleate, Cithrol GDO N/E, Cithrol GDO S/E; glyceryl distearate, Cithrol GDS N/E, Cithrol GDS S/E; glyceryl tribehenate, Syncrowax HR-C, Syncrowax HRS-C; Croda Incorporated; (3) glyceryl tris-12-hydroxy stearate, Cutina BW; Henkel corporation, (4) glyceryl trilaurate, Cyclochem GTL; glyceryl triisostearate, Cyclochem GTIS; Rhone and Poulenc Corporation, (5) glyceryl di/tri palmito stearate, Precirol ATO; glyceryl di/tri tristearate, Precirol WL-2155; Gatte Fosse Company, (6) glyceryl hydrogenated rosinate, Foral 85; glyceryl rosinate, Poly-pale-ester 10; both Hercules Incorporated; (7) glyceryl trioleate, Acconom GTO; glyceryl tristearate, Captex 5380; all being Capital City Products Company, glyceryl linoleate, Grindtek MOL 90; glyceryl myristate, Grindtek MM 90; Grindsted Products Incorporate, (8) glyceryl capromyristate, Radia 7104; glyceryl hydroxy stearate, Radiasurf 7146; glyceryl oleate, Radiasurf 7150, Radiasurf 7151SE; glyceryl stearate, Radiasurf 7140, Radiasurf 7141SE; glyceryl ricinoleate, Radiasurf 7153, glyceryl tricaprate/caprylate, Radianol 2106, Radianol 7106; glyceryl triheptanoate, Radianol 7376; Oleofina Belgium, (9) glyceryl tribenzoate, Benzoflex S-304; Velsicol Chemical Company, (10) glyceryl caprate, Imwitor 310; glyceryl caprylate, Imwitor 308; glyceryl mono/dicaprylate, Imwitor 908; glyceryl mono/dimyristate, Imwitor 914; glyceryl stearate palmitate, Imwitor 940K; glyceryltrilaurate/stearate, Softisan Hard Fats; Tripalmitin, Dynasam 116; Huls America Incorporated, (11) glyceryl trioctanoate, Nikkol-trifat S-308; (12) Nikko Chemical Company, glyceryltriacetyl hydroxystearate, Paricin 8; glyceryl triacetyl ricinioleate, Paricin 8; Cas Chem Incorporated; with glyceryl tris-12-hydroxy stearate, Cutina BW; Henkel Corporation, being preferred; (B) glycol esters, (1) glycol dilaurate, Cithrol EGDL N/E, Cithrol EGDL S/E; glycol dioleate, Cithrol EGDO N/E, Cithrol EGDO S/E; glycol distearate, Cithrol EGDS N/E, Cithrol EGDS S/E; glycol oleate, Cithrol EGMO N/E, Cithrol EGMO S/E; glycol ricinoleate, Cithrol EGMR N/E, Cithrol EGMR S/E; glycol stearate, Cithrol EGMS N/E, Cithrol EGMS S/E; Croda Incorporated; (2) glycol dibehenate, Rewopal PG 340; Rewo Chemische Werke GmbH, Germany, (3) propylene glycol dicaprylate, Crodamol PC; propyleneglycol myristate, Radiasurf 7196; propyleneglycol oleate, Radiasurf 7206, Oleofina Belgium; (4) propylene glycol dipelargonate, Schercemol PGDP; propylene glycol laurate, Schercemol PGML; propylene glycol stearate, Schercemol PGMS; propyleneglycol distearate, Mapeg PGDS; PPG-Mazer, division of PPG Chemicals Corporation, (5) propyleneglycol hydroxystearate, Paricin 9; propyleneglycol ricinioleate, Flexricin 9; Cas Chem Incorporated, (6) propylene glycol dibenzoate, Benzoflex 284 ; Velsicol Chemical Company, (7) propylene glycol dicaprylate/caprate, Standmul 302; propylene glycol isostearate, Emerest 2384; Henkel corporation, and sugar esters acetylated sucrose distearate, Crodesta A-10, Crodesta A-20; sucrose cocoate, Crodesta SL-40; sucrose distearate, Crodesta F-10, Crodesta F-50, Crodesta F-110; Croda Incorporated, with Sucrose cocoate, Crodesta SL-40; being preferred; (C) glucose esters methyl gluceth-20 distearate, Glucam E-20; methyl glucose dioleate, Glucate DO; methyl glucose sesquistearate, Glucate SS; Amerchol Corporation, (3) sucrose di/tristearate, Ryoto Sugar Ester S-170, S-270, S-370; sucrose laurate, Ryoto Sugar Ester LWA-1540; sucrose mono/distearate, Ryoto Sugar Ester S-970, S-1170; sucrose oleate, Ryoto Sugar Ester OWA-1570; sucrose palmitate, Ryoto Sugar Ester P-1570, P-1670; sucrose stearate, Ryoto Sugar Ester S-1570, S-1670; Ryoto Company, (4) sorbitan isostearate, S-Maz-67; sorbitan laurate, S-Maz-20; sorbitan palmitate, S-Maz-40; sorbitan oleate, S-Maz-80; sorbitan sesquioleate, S-Maz-83R; sorbitan sesquitallate, S-Maz-93R; sorbitan stearate, S-Maz-60; sorbitan tallate, S-Maz-90; sorbitan trioleate, S-Maz-85; sorbitan tristearate, S-Maz-65; sorbitan tritallate, S-Maz-95; PPG-Mazer, division of PPG Chemicals Corporation, (5) sorbitan myristate, Nissan Nonion MP-30R, Nippon oils and Fat Company, with Sorbitan tritallate, S-Maz-95; PPG-Mazer, division of PPG Chemicals Corporation, being preferred.

Low molecular weight ester compounds such as sorbitan esters, glucose esters, sucrose esters, acetylated sucrose distearate, are preferred because these are environment friendly.

The anionic antistatic components to be used in combination with anionic latex based polymers of the fourth traction controlling and toner receiving layer include fatty ester modifications of phosphates (Alkaphos B6-56A, Alkaril Chemicals); sulfosuccinic acid esters Alkasurf SS-0-75 [sodium dioctyl sulfosuccinate], Alkasurf SS-DA4-HE [ethoxylated alcohol sulfosuccinate], Alkasurf SS-L7DE [sodium sulfosuccinate ester of lauric diethanol amide], Alkasurf SS-L-HE (sodium lauryl sulfosuccinate], Alkaril Chemicals); sulfonic acid (Alkasurf CA, [calcium dodecyl benzene sulfonate], Alakasurf 1PAM [isopropylamine dodecyl benzene sulfonate], Alkaril Chemicals); alkyl amines (Alkamide SDO [soya diethanol amide], Alkamide CDE [coco diethanol amide], Alkamide CME [coco monoethanol amide], Alkamide L9DE [lauric diethanol amide], Alkamide L7Me [lauric monoethanol amide], Alkamide L1PA [lauric monoisopropylamide], Alkaril Chemicals); fatty imidazolines and their derivatives such as Alkazine-O [oleic derivative]; Alkazine-TO [tail oil derivatives]; Alkateric 2CIB (dicarboxylic coco imidazoline sodium salt), Alkaril Chemicals.

The water soluble or dispersible light fast agents of the fourth coating include (A) lightfast UV absorbing agents present in amounts of from about 8 parts by weight to about 0.5 part by weight and preferably from about 6 parts by weight to about 0.5 part by weight such as (1) poly[N,N-bis(2,2,6,6-tetramethyl-4-piperidinyl)-1,6-hexanediamine-co-2,4-dichloro-6-morpholino-1,3,5-triazine), available as Cyasorb UV-3346, #41,324-0; (2) 1-[N-[poly(3-allyloxy-2-hydroxypropyl)-2-amino ethyl]-2-imidazolidinone, #41,026-8, both from Aldrich Chemical Company; (B) lightfast antioxidants present in amounts of from about 4 parts by weight to about 0.25 part by weight and preferably from about 3 parts by weight to about 0.25 part by weight such as (1) 2,6-di-tert-butyl-4-methylphenol, Ultranox-226, General Electric company, (2) 2,6-di-tert-butyl-ρ-cresol, Vulka nox-KB, Mobay Chemicals, (3) 2,6-di-tert-butyl-α-dimethylamino-ρ-cresol, Ethanox-703, Ethyl Corporation, (4) 2,2'-isobutylidene-bis(4,6-dimethylphenol), Vulkanox-NKF, Mobay Chemicals, (5) 2,2'-methylenebis(6-tert-butyl-4-methyl phenol), Cyanox 2246, #41,315-5, Aldrich Chemical Company, (C) lightfast antiozonants present in amounts of from about 4 parts by weight to about 0.25 part by weight and preferably from about 3 parts by weight to about 0.25 part by weight such as (1) N-isopropyl-N'-phenyl-phenylene diamine, Santoflex-IP, (2) N-(1,3-dimethylbutyl)-N'-phenyl-phenylene diamine, Santoflex-13, (3) N,N'-bis(1,4-dimethylpentyl)-p-phenylene diamine, Santoflex-77, Monsanto Chemicals, and (4) N,N'-di(2-octyl)-ρ-phenylene diamine, Antozite-1, Vanderbilt Corporation.

The water soluble or dispersible biocides of the fourth traction controlling and toner receiving coating present in amounts of from about 3 parts by weight to about 0.1 part by weight and preferably from about 2 to about 1 part by weight include nonionic biocides, such as 2-bromo-4'-hydroxyaceto phenone, (Busan 90, Buckman Laboratories); 3,5-dimethyl tetrahydro-2H-1,3,5-thiadiazine-2-thione (Slime-Trol RX-28, Betz Paper Chem Inc.; (a nonionic blend of 5-chloro-2-methyl-4-isothiazoline-3-one, 75 percent by weight, and 2-methyl-4-isothiazolin-3-one, 25 percent by weight), (available as Amerstat 250 from Drew Industrial Division; Nalcon 7647, from Nalco Chemical Company; Kathon LX, from Rohm and Haas Company); and the like, anionic biocides, such as anionic potassium N-hydroxymethyl-N-methyl-dithiocarbamate (available as Busan 40 from Buckman Laboratories Inc.); an anionic blend of methylene bis-thiocyanate, 34 percent by weight, sodium dimethyl-dithiocarbamate, 33 percent by weight, and sodium ethylene-bis-dithiocarbamate, 33 percent by weight, (available as Amerstat 282 from Drew Industrial Division; AMA-131 from Vinings Chemical Company).

The fillers of the fourth coating present in amounts of from about 1 to about 88.9 parts by weight and preferably from about 11 to about 73 parts by weight may be selected from those used for the preparation of the first, second and third layers and these include fillers and pigments such as colloidal silica, calcium carbonate, fluorescent pigments of coumarin derivatives, and the like. The fourth toner receiving coating may also be applied on to paper from a solvent.

The coatings of the present invention can be applied to the substrate by any suitable technique. For example, the layer coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. Once the desired amount of coating has been applied to the web, the coating is dried, typically at from about 25 to about 200° C. in an air dryer.

The hydrophilic coating layer composition blend is dissolved and coated on to paper from a mixture of two or more solvents where one of the solvents such as water is a first solvent for the hydrophilic polymeric binder and the other solvents such as methanol, ethanol, propanol, acetone, ethyl acetate or mixtures thereof, are swelling/gelling agents for the hydrophilic polymeric binder. The proportion of the first solvent in the mixture of solvents varies from about 25 to about 75 percent by weight and the proportion of the gelling solvent or mixtures thereof vary from about 75 to about 25 percent by weight. The wet coating weight of the hydrophilic layer is generally between about 20 grams/meter$^2$ to about 200 grams/meter$^2$ resulting in a dry thickness of between about 6 microns to about 25 microns. The coatings are applied on to the substrate on a Coater such as a Faustel Coater equipped with an air dryer having three drying zones each of which can be set at different temperatures. After the gel composition has been applied on to paper on the coater, these coatings are dried between 20 to 25° C. in open air atmosphere prior to their entering an air dryer system set at incremental temperatures in the progressive drying zones such as, set at temperatures of between 30 to 90° C. in the first drying zone, between 80 to 150° C. in the second drying zone, and between 120 to 200° C. in the third drying zone. The primary purpose of subjecting the gel coatings to incremental-temperature-drying conditions is to preserve their gel structure after the coatings have been dried. The resident time of the wet coating is from about 30 seconds to about a minute from the time coating is applied to the substrate web and the time the substrate web enters the air dryer, 1 minute to about 4 minutes in each drying zone depending on the speed of the coater, higher the speed shorter the resident time.

The coated substrates, such as the coated xerographic papers of the present invention in embodiments exhibit reduced curl upon being printed with solid toners, particularly in situations wherein the toner image is dried by exposure to block heat/radiant heat/microwave radiation. Generally, the term curl refers to the distance between the base line of the arc formed by the transparency or recording sheet when viewed in cross-section across its width (or shorter dimension, for example, 8.5 inches in an 8.5 by 11 inch sheet, as opposed to length, or longer dimension, for example, 11 inches in an 8.5 by 11 inch sheet) and the midpoint of the arc. To measure curl, a xerographic paper can be held with the thumb and forefinger in the middle of one of the long edges of the xerographic paper (for example, in the middle of one of the 11 inch edges in an 8.5 by 11 inch paper) and the arc formed by the xerographic paper can be matched against a pre-drawn standard template curve.

The coated substrates, such as the coated xerographic papers of the present invention in embodiments exhibit little or no blocking. Blocking refers to the transfer of ink or toner from a printed image from one sheet to another when xerographic papers are stacked together. The xerographic papers of the present invention exhibit substantially no blocking under, for example, environmental conditions of from about 20 to about 80 percent relative humidity and at temperatures of about 80° F.

The optical density measurements recited herein were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

The lightfast values of the xerographic images were measured in the Mark V Lightfast Tester obtained from Microscal Company, London, England.

The total thickness of the coated paper is 136 microns and the preferred range is between 130 to 150 microns.

Specific embodiments of the invention will now be described in detail. These examples are intended to be illustrative, and the invention is not limited to the materials, conditions, or process parameters indicated. All parts and percentages are by weight unless otherwise indicated.

EXAMPLE I

Twenty xerographic papers were prepared by the solvent extrusion process (single side each time initially) on a Faustel Coater using a one slot die by providing for each a paper base sheet (roll form) with a thickness of 100 microns with a Hercules size values of 1,000 seconds and coating the front side of the base sheet with as first hydrophilic antistatic coating comprised of a blend of 40 parts by weight of a binder of hydroxypropyl methyl cellulose, (K35LV), 20 parts by weight of water soluble filler sodium bisulfate monohydrate (Aldrich #23,371-4) and 10 parts by weight of the antistatic cationic component polymethyl acrylate trimethyl ammonium chloride latex, HX42-1, (the components of the latex are as follows: (1) acrylate copolymer 34 percent by weight, (2) 1-methoxy-2-propanol 47 percent by weight, (3) 2,2',2"-nitrilotris ethanol 3 percent by weight, and (4) water 16 percent by weight), Interpolymer Corporation, 25 parts by weight of the water and methyl alcohol what specific alcohol, methanol insoluble filler colloidal silica, Syloid 74, W.R. Grace and Company, 4 percent by weight of filler dispersant pentaerythritol ethoxylate (3/4EO/OH), Aldrich #41,615-0, 1 percent by weight of the biocide cationic poly(oxy ethylene(dimethylamino)-ethylene (dimethylamino)ethylene dichloride) (Busan 77, Buckman Laboratories Inc.) which blend was present in a concentration of 5 percent by weight in a 50:50 blend of water and methanol. Subsequent to air drying at 25° C. in an open air atmosphere prior to entering an air dryer system, set at temperatures of 50° C. in the first drying zone, 90° C. and the difference in weight prior to and subsequent to coating, the dried coated base paper rolls contained 0.8 gram in a thickness of 8 microns of the first hydrophilic antistatic coating. This first hydrophilic antistatic coating is further overcoated with a second toner receiving coating composition blend comprised of 66 parts by weight of a branched saturated polyester resin Vitel 833 [CAS #112864-14-9; melting point=71° C.; Mw=9800, Mn=4600] obtained from Shell Chemical Company, 20 percent by weight toner wetting gent isobutyl palmitate, Kessco IBP, 2 parts by weight the lightfast UV agent poly(4-hydroxy-2,2,6,6-tetramethyl-1-piperidine ethanol/dimethyl succinic acid), Ciba-Geigy Corporation, 1 part by weight lightfast antioxidant didodecyl 3,3'-thiodipropionate, Cyanox, LTDP, #D12,840-6, Aldrich Chemical company, 1 part by weight of the lightfast antiozonant compound N-(1,3-dimethylbutyl)-N'-phenyl-phenylene diamine, Monsanto Chemicals, 10 parts by weight of the filler zirconium oxide, and thereafter the blend was dissolved and coated on to paper from 10 percent by weight solution in ethylacetate. Subsequent to air drying at 100° C. and monitoring the difference in weight prior to and subsequent to coating, the dried coated base paper rolls contained 1.0 grams in a thickness of 10 microns of the second toner receiving layer and wherein the total thickness at this point was 118 microns. Rewinding the two layer coated base paper on an empty core, the uncoated side of the base paper was coated simultaneously with the third and fourth hydrophilic coatings using a two slot dye. The composition of the third 8 micron thick hydrophilic antistatic coating was the same as that of the first coating, and the fourth layer which has dual purpose as it acts as a traction agent so that the paper can be easily transported through for example an imaging system, like a xerographic copier without jamming and it can accept toner images with the following composition: 55 parts by weight of anionic sodio-sulfo substituted polyester latex Eastman AQ-29D, [glass transition temperature=29° C.]; 20 parts by weight of the water dispersible toner wetting agent glyceryl tris-12-hydroxy stearate, Cutina BW, Henkel Corporation, 2 parts by weight of the water soluble lightfast UV absorbing agent poly[N,N-bis (2,2,6,6-tetramethyl-4-piperidinyl)-1,6-hexanediamine-co-2,4-dichloro-6-morpholino-1,3,5-triazine), Cyasorb UV-3346, #41,324-0, Aldrich Chemical Company, 1 part by weight of the lightfast antioxidant 2,6-di-tert-butyl-4-methyl phenol, Ultranox 226, General Electric company, 1 part by weight lightfast antiozonant N-isopropyl-N'-phenyl-phenylene diamine, Santoflex- IP, Monsanto Chemicals, 1 part by weight nonionic biocide 2-bromo-4'-hydroxy acetophenone, (Busan 90, Buckman Laboratories), 20 parts by weight of the filler colloidal silica. This fourth latex based coating was present in a concentration of 35 percent by weight in water. Subsequent to air drying at 25° C. in open air atmosphere prior to entering an air dryer system, set at temperatures of 50° C. in the first drying zone, 90° C. in the second drying zone, and 150° C. in the third drying zone and monitoring the difference in weight prior to and subsequent to coating, the dried coated base paper rolls contained 0.8 gram in a thickness of 8 microns of the third hydrophilic antistatic coating overcoated with a 10 micron thick traction controlling and toner receiving fourth coating. The total thickness of the entire coated paper with all four coatings was 136 microns. The coated xerographic papers were cut from this roll into 8.5 by 11.0 inch cut sheets.

These coated xerographic photographic papers were utilized in a Xerox Corporation 5760 MajestiK™ Digital Color Copier transporting polyester resin based toners comprised primarily of (1) 70 percent by weight of a polyester derived from the reaction product of terephthalic acid and bisphenol-A-ethylene oxide adduct with cyclohexane dimethanol, and obtained from Dainippon Ink and Chemicals company and (2) 30 percent by weight of a colorant such as cyan [C.I. 15:3 Pigment Blue], magenta [C.I. 48 Pigment Red], yellow [C.I. Pigment Yellow], all three being available from Danichiseika Color and Chemicals Manufacturing Company, Limited, and black [carbon black Regal 330$^R$] available from Mitsubishi Kasei Corporation and images were obtained on the toner receiving side of the photographic paper. These images had gloss values of 95, as measured with a BYK Gardner micro-tri-gloss 750 Gloss Meter and optical density values of 1.65 (cyan), 1.40 (magenta), 1.0 (yellow) and 1.75 (black). These images were 100 percent waterfast as determined by visual observation (measuring optioal density values before and after washing) when washed with water for 2 minutes at 50° C. and 100 percent lightfast. The lightfast values of the xerographic images were measured in the Mark V Lightfast Tester obtained from Microscal Company, London, England. This was done by measuring optical density values before and after exposure for a period of three months without any change in their optical density. These coated xerographic papers were also utilized in a Xerox 5760 MajestiK™ Digital Color Copier with a polyester resin based toner and images were obtained on the traction controlling side of the photographic paper. These images had gloss values of 85, optical density values of 1.50 (cyan), 1.35 (magenta), 0.95 (yellow) and 1.55 (black). These images were free of fuser oil, 100 percent waterfast when washed with water for 2 minutes at 50° C. and 100 percent lightfast for a period of three months without any change in their optical density.

EXAMPLE II

Twenty xerographic papers were prepared similar to Example I by a solvent extrusion process (single side each time initially) on a Faustel Coater using a one slot die by providing for each a paper base sheet (roll form) with a thickness of 100 microns and a Hercules size values of 1,000 seconds and coating the front side of the base sheet with a first hydrophilic antistatic coating comprised of a blend of 40 parts by weight of the binder hydroxypropyl hydroxyethyl cellulose, Aqualon Company, 20 parts by weight of water soluble filler sodium carbonate (Aldrich #22,232-1) and 10 parts by weight of the antistatic cationic component tetra methyl ammonium bromide (Aldrich #19,575-8), 25 parts by weight of the water insoluble filler titanium dioxide (Rutile or Anatase, NL Chem Canada, Inc.), 4 percent by weight of the water soluble filler dispersant (a compound that coats the filler to allow even distribution in water leading to a smooth coating dispersion) pentaerythritol propoxylate, (5/4 PO/OH), Aldrich #41,874-9,1 percent by weight of the biocide cationic poly (oxy ethylene (dimethylamino)-ethylene (dimethyl amino) ethylene dichloride) (Busan 77, Buckman Laboratories Inc.) which blend was present in a concentration of 5 percent by weight in a 50:50 blend of water and ethanol. Subsequent to air drying at 25° C. in open air atmosphere prior to entering an air dryer system, set at temperatures of 50° C. in the first drying zone, 90° C. in the second drying zone, and 150° C. in the third drying zone and monitoring the difference in weight prior to and subsequent to coating, the dried coated base paper rolls contained 0.8 gram in a thickness of 8 microns the first hydrophilic antistatic coating. This first hydrophilic antistatic coating is further overcoated with a second toner receiving coating composition blend comprised of 66 parts by weight of the polyester resin Vitel 5833 obtained from Shell Chemical Company, 20 percent by weight of the toner wetting agent cetearyl octanoate, Crodamol CAP, 2 parts by weight of the lightfast UV agent, 2-hydroxy-4-(octyloxy) benzophenone, #41,315-1, from Aldrich Chemical Company, 1 part by weight lightfast antioxidant dicetyl-3,3'-thiodipropionate, from Evans Chemetics Corporation, 1 part by weight of the lightfast antiozonant compound N,N'-di(2-octyl)-ρ-phenylene diamine, from Vanderbilt Corporation, 10 parts by weight of the filler of hollow composite microspheres of polyvinylidene chloride/acrylonitrile copolymer shell 15 percent by weight and calcium carbonate 85 percent by weight, available as Dualite M 6001 AE, from Pierce & Stevens Corporation. The blend was then dissolved in ethylacetate to prepare 10 percent by weight solution and then coated on to paper. Subsequent to air drying at 100° C. and monitoring the difference in weight prior to and subsequent to coating, the dried coated base paper rolls contained 1.0 gram in a thickness of 10 microns of the second toner receiving layer. Rewinding the two layer coated base paper on an empty core, the uncoated side of the base paper was coated simultaneously with the third and fourth hydrophilic coatings using a two slot dye. The composition of the third 10 micron thick hydrophilic antistatic coating was the same as that of the first coating, and wherein the fourth traction controlling/toner receiving coating had the following composition: 55 parts by weight anionic polyester latex Eastman AQ-29D, 20 parts by weight water dispersible toner wetting agent sorbitan tritallate, S-Maz-95, PPG-Mazer, division of PPG Chemicals Corporation, 2 parts by weight water soluble lightfast UV absorbing agent 1-[N-[poly(3-allyloxy-2-hydroxy propyl)-2-amino ethyl]-2-imidazolidinone, #41, 026-8, Aldrich Chemical Company, 1 part by weight lightfast antioxidant 2,6-di-tert-butyl-α-dimethylamino-ρ-cresol, available as Ethanox 703, from Ethyl Corporation, 1 part by weight of the lightfast antiozonant N-isopropyl-N'phenyl-phenylene diamine, Santoflex IP, Monsanto Chemicals, 1 part by weight of the anionic biocide potassium N-hydroxymethyl-N-methyl-dithiocarbamate (Busan 40, Buckman Laboratories Inc.), 20 parts by weight filler colloidal silica. This fourth latex based coating was present in a concentration of 35 percent by weight in water. Subsequent to air drying at 25° C. in open air atmosphere prior to entering an air dryer system, set at temperatures of 50° C. in the first drying zone, 90° C. in the second drying zone, and 150° C. in the third drying zone and monitoring the difference in weight prior to and subsequent to coating, the dried coated base paper rolls contained 0.8 gram in a thickness of 8 microns of the third hydrophilic antistatic coating overcoated with a 10 micron thick traction controlling and toner receiving fourth coating. The coated xerographic papers were cut from this roll into 8.5 by 11.0 inch cut sheets.

These coated xerographic photographic papers (total thickness of the coated paper was 136 microns) were utilized in a Xerox Corporation 5760 MajestiK™ Digital Color Copier transporting polyester resin based toners and images were obtained on the toner receiving side of the photographic paper. These images had gloss values of 95, optical density values of 1.60 (cyan), 1.45 (magenta), 1.05 (yellow) and 1.70 (black). These images were 100 percent waterfast when washed with water for 2 minutes at 50° C. and 100 percent lightfast for a period of three months without any change in their optical density. These coated xerographic papers were utilized in a Xerox 5760 MajestiK™ Digital Color Copier with polyester resin based toners and images were obtained on the traction controlling side of the photographic paper. These images had gloss values of 65, optical density values of 1.55 (cyan), 1.30 (magenta), 0.90 (yellow) and 1.50 (black). These images were free of fuser oil, 100 percent waterfast when washed with water for 2 minutes at 50° C. and 100 percent lightfast for a period of three months without any change in their optical density.

EXAMPLE III

Twenty xerographic papers were prepared by the solvent extrusion process (single side each time initially) on a Faustel Coater using a two slot die by providing for each a paper base sheet (roll form) with a thickness of 100 microns and a Hercules size values of 1,000 seconds and coating the front side of the base sheet simultaneously with two hydrophilic coatings where the first hydrophilic antistatic coating was comprised of a blend of 40 parts by weight of the binder hydroxypropyl hydroxyethyl cellulose, Aqualon Company, 20 parts by weight of water the soluble filler sodium carbonate (Aldrich #22,232-1) and 10 parts by weight of the antistatic cationic component tetra methyl ammonium bromide (Aldrich #19,575-8), 25 parts by weight of the water insoluble filler titanium dioxide (Rutile or Anatase, NL Chem Canada, Inc.), 4 percent by the weight of the filler dispersant pentaerythritol propoxylate, (5/4 PO/OH), Aldrich #41,874-9, 1 percent by weight of the biocide cationic polyoxy ethylene(dimethylamino)-ethylene(dimethyl amino)ethylene dichloride) (Busan 77, Buckman Laboratories Inc.) which blend was present in a concentration of 5 percent by weight in a 50:50 blend of water and n-butanol and the second toner receiving coating was comprised of 55 parts by weight of the anionic polyester latex Eastman AQ-29D, 20 parts by weight of the water dispersible toner wetting agent sucrose cocoate, Crodesta F-110, Croda Incorporated, 2 parts by weight of the water soluble lightfast UV absorbing agent 1-[N-[poly(3-allyloxy-2-hydroxy propyl)-2-amino ethyl]-2-imidazolidinone, #41,026-8, Aldrich Chemical Company, 1 part by weight of the lightfast antioxidant 2,6-di-tert-butyl-α-dimethylamino-ρ-cresol, available as Ethanox 703, Ethyl Corporation, 1 part by weight of the lightfast antiozonant N-isopropyl-N'-phenyl-phenylene diamine, Santoflex IP, Monsanto Chemicals, 1 part by weight of the anionic biocide potassium N-hydroxymethyl-N-methyl-dithiocarbamate (Busan 40, Buckman Laboratories Inc.), and 20 parts by weight of the filler colloidal silica. This second latex based coating was present in a concentration of 35 percent by weight in Water. Subsequent to air drying at 25° C. in open air atmosphere prior to entering an air dryer system, set at temperatures of 50° C. in the first drying zone, 90° C. in the second drying zone, and 150° C. in the third drying zone and monitoring the difference in weight prior to and subsequent to coating, the dried coated base paper rolls contained 0.8 gram in a thickness of 8 microns of the first hydrophilic antistatic coating overcoated with a 10 micron thick second toner receiving coating. Rewinding the two layered coated paper roll on an empty core and using this new roll the uncoated back side was coated with the same coating composition as on the front side for the third and fourth coating layers. Subsequent to air drying at 25° C. in open air atmosphere prior to entering an air dryer system, set at temperatures of 50° C. in the first drying zone, 90° C. in the second drying zone, and subsequent to coating, the dried coated base paper rolls contained 0.8 gram in a thickness of 8 microns of the third hydrophilic antistatic coating overcoated with a 10 micron thick fourth traction controlling/toner receiving coating. This two sided coated paper roll had a gloss value of 50. This coated roll was further dried against a smooth chrome plated roll at 50° C. to provide a gloss value of 80. The coated xerographic papers were cut from this roll into 8.5 by 11.0 inch cut sheets.

These coated xerographic photographic papers having a thickness of 136 microns were utilized in a Xerox 5760 MajestiK™ Digital Color Copier transporting polyester resin based toners of Example I throughout and images were obtained on the toner receiving side of the photographic paper. These images had gloss values of 85, optical density values of 1.60 (cyan), 1.45 (magenta), 1.05 (yellow) and 1.70 (black). These images were free of fuser oil, 100 percent waterfast when washed with water for 2 minutes at 50° C. and 100 percent lightfast for a period of three months without any change in their optical density.

Other embodiments and modifications of the present invention may occur to those skilled in the art subsequent to a review of the information presented herein; these embodiments and modifications, as well as equivalents thereof, are also included within the scope of this invention.

What is claimed is:

1. A substrate with four layers, two coating layers on the front side of the substrate and two coating layers on the reverse side of the substrate, wherein said front side coatings are comprised of a antistatic hydrophilic layer in contact with the substrate comprised of (1) a hydrophilic binder, (2) a water soluble filler, (3) a water insoluble filler, (4) an antistatic component (5) an optional filler dispersant, and (6) an optional biocide, and a second hydrophobic toner receiving coating situated on top of the first coating comprised of (1) a binder, (2) a toner wetting agent, (3) a lightfast UV absorber, (4) a lightfast antioxidant/antiozonant compound, and (5) a filler; and wherein said two coatings in contact with the reverse side of the substrate are comprised of a third hydrophilic antistatic coating comprised of (1) a binder polymer, (2) a water soluble filler, (3) a water insoluble filler, (4) an antistatic agent, (5) an optional filler dispersant and (6) an optional biocide, and a fourth toner receiving coating layer on top of the third hydrophilic coating comprised of (1) a latex binder, (2) a toner wetting agent, (3) a lightfast UV absorber, (4) a lightfast antioxidant compound, (5) a lightfast antiozonant compound, (6) an optional filler, and (7) an optional biocide.

2. A coated substrate in accordance with claim 1 wherein said substrate is a porous cellulosic component.

3. A coated substrate in accordance with claim 2 wherein the cellulosic substrate is comprised of alkaline sized and acid sized blends of hardwood kraft and softwood kraft fibers which blends contain from about 10 percent to 90 percent by weight of soft wood and from about 90 to about 10 percent by weight of hardwood.

4. A coated substrate in accordance with claim 2 wherein the sizing value of the cellulosic component is from about 200 seconds to about 1,100 seconds, the porosity is from about 50 to about 300 mil/minute and the thickness of the substrate is from about 50 microns about 250 microns.

5. A substrate in accordance with claim 1 wherein in the first hydrophilic coating layer the binder is present in amounts of from about 70 parts by weight to about 20 parts by weight, the water soluble filler is present in an amount of from about 4 parts by weight to about 30 parts by weight, the antistatic component is present in an amount of from about 5 parts by weight to about 1 parts by weight, the filler is present in an amount of from about 16 parts by weight to about 48 parts by weight, the filler is present in amounts of from about 3 parts by weight to about 0.9 parts by weight, and the biocide is present in amounts of from about 2 parts by weight to about 0.1 part by weight, and wherein said substrate is optionally paper.

6. A coated substrate in accordance with claim 1 wherein the hydrophilic binder of the first antistatic coating is (1) cellulose, (2) methyl cellulose, (3) ethyl hydroxy ethyl cellulose, (4) hydroxypropyl methyl cellulose, (5) diethylammonium chloride hydroxyethyl cellulose, (6) hydroxypropyl trimethyl ammonium chloride hydroxyethyl cellulose, (7) sodium carboxymethyl cellulose, (8) poly (acrylamide), (9) acrylamide-acrylicacid copolymers, or (10) poly(ethylene oxide).

7. A coated substrate in accordance with claim 6 wherein hydrophilic binder polymer of the said antistatic coating is hydroxypropylpyl methylcellulose, or acrylamide-acrylic acid copolymers.

8. A coated substrate in accordance with claim 1 wherein the water soluble filler of the first layer is selected from the group consisting of (1) inorganic salts, (2) organic salts, (3) and mixtures thereof.

9. A substrate in accordance with claim 8 wherein said salts are sodium carbonate, or calcium propionate.

10. A coated substrate in accordance with claim 1 wherein the filler of the first hydrophilic antistatic coating is selected from the group consisting of (1) hollow composite microspheres of polyvinylidene chloride/acrylonitrile copolymer shell in an optional amount of about 15 percent by weight and calcium carbonate in an optional amount of about 85 percent by weight, (2) zirconium oxide, (3) colloidal silicas, (4) titanium dioxide (5) barium titanate, and mixtures thereof.

11. A substrate in accordance with claim 10 wherein said coating is comprised of hollow composite microspheres of polyvinylidene chloride/acrylonitrile copolymer shell about 15 percent by weight and calcium carbonate about 85 percent by weight.

12. A coated substrate in accordance with claim 1 wherein the dry thickness of the first antistatic coating layer is about 0.1 micron to about 25 microns.

13. A coated substrate in accordance with claim 1 wherein in the second toner receiving layer the binder is present in an amount of from about 50 parts by weight to about 20 parts by weight, the toner wetting agent is present in an amount of from about 25 parts by weight to about 5 parts by weight, the lightfast UV absorber compound is present in an amount of from about 8 parts by weight to about 0.5 parts by weight, the lightfast antioxidant compound is present in an amount of from about 4 parts by weight to about 0.25 parts by weight, the lightfast antiozonant compound is present in an amount of from about 4 parts by weight to about 0.25 parts by weight and, the filler is present in amounts of from about 13 parts by weight to about 74 parts by weight.

14. A coated substrate in accordance with claim 1 wherein the binder of the second toner receiving layer is present in an amount of from about 50 parts by weight to about 20 parts by weight and is selected from the group consisting of esters of (1) polyethylene terephthalate resins, (2) polybutylene terephthalate ester resins, (3) polyester-ether resins, (4) polycarbonates, and (5) polyester-co-polycarbonate.

15. A substrate in accordance with claim 14 wherein said ester is a polyethylene terephthalate polymer.

16. A coated substrate in accordance with claim 1 wherein the toner wetting agent of the second layer is present in an amount of from about 25 parts by weight to about 5 parts by weight and is selected from the group consisting of (1) monoalkyl esters, (2) dialkyl esters, (3) trialkyl esters, (4) alkyl triesters, (5) alkoxyesters, (6) pentaerythritol esters and (7) peroxy esters.

17. A substrate in accordance with claim 16 wherein said ester is a mono alkyl ester.

18. A coated substrate in accordance with claim 1 wherein the dry thickness of the second toner receiving coating layer is between about 0.1 microns to about 25 microns.

19. A coated substrate in accordance with claim 1 wherein the dry thickness of the third hydrophilic coating layer is from about 0.1 micron to about 25 microns.

20. A coated substrate in accordance with claim 1 wherein in the fourth coating the latex binder is present in an optional amount of from about 50 parts by weight to about 20 parts by weight, the toner wetting agent is present in an amount of from about 25 parts by weight to about 5 parts by weight, the lightfast UV absorber compound is present in an amount of from about 6 parts by weight to about 0.5 part by weight, the lightfast antioxidant compound is present in an amount of from about 3 parts by weight to about 0.25 part by weight, the lightfast antiozonant compound is present in an amount of from about 3 parts by weight to about 0.25 part by weight, the filler is present in an amount of from about 11 parts by weight to about 73 parts by weight and, the biocide is present in an amount of from about 2 parts by weight to about 1 part by weight.

21. A coated substrate in accordance with claim 1 wherein the binder of the fourth layer is present in optional amounts of from about 50to about 20 parts by weight and is comprised of anionic latex binders of (1) polyglycolide, (2) polyglactin, (3) preferred is-polyester latex, (4) styrene-butadiene latex, (5) styrene-acrylate latex, (6) ethylene-vinylacetate latex, (7) vinyl acetate-acrylic copolymer latex, or (8) butadiene-acrylonitrile-styrene terpolymer latex.

22. A coated substrate in accordance with claim 1 wherein the binder of the fourth layer is a polyester latex, the toner wetting agent of the fourth layer is optionally present in amounts of from about 25 to about 5 parts by weight and is: (1) a glyceryl ester, (2) a glycol ester, or (3) a sugar ester.

23. A coated xerographic paper in accordance with claim 1 wherein the total dry thickness of the first and second layer is between 0.5 microns to about 30 microns, and wherein the dry thickness of the third and fourth layer is between about 0.5 microns to about 30 microns.

24. A coated xerographic substrate comprised of a substrate with four layers, two coating layers on the front side of the substrate and two coating layers on the reverse side of the substrate, wherein said front side coatings are comprised of A. (1) a hydrophilic binder, (2) a water soluble filler, (3) a water insoluble filler, (4) an antistatic component (5) an optional filler dispersant, and (6) an optional biocide, and B. a second hydrophobic toner receiving coating situated on top of the first coating comprised of (1) a binder, (2) a toner wetting agent, (3) a lightfast UV absorber, (4) a lightfast antioxidant/antiozonant compound, and (5) an optional filler; and wherein said two coatings in contact with the reverse side of the substrate are comprised of a third hydrophilic antistatic coating comprised of C. (1) a binder polymer, (2) a water soluble filler, (3) a water insoluble filler, (4) an antistatic agent, (5) an optional filler dispersant and (6) an optional biocide, and D. a fourth toner receiving coating layer on top of the third hydrophilic coating comprised of (1) a latex binder, (2) a toner wetting agent, (3) a lightfast UV absorber, (4) a lightfast antioxidant compound, (5) a lightfast antiozonant compound, (6) an optional filler, and (7) an optional biocide.

* * * * *